United States Patent
> Dong et al.

(10) Patent No.: US 11,751,011 B2
(45) Date of Patent: Sep. 5, 2023

(54) POSITIONING METHOD AND USER EQUIPMENT

(71) Applicant: Huawei Technologies Co., Ltd., Shenzhen (CN)

(72) Inventors: Mingjie Dong, Shenzhen (CN); Kangmin Huang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/190,970

(22) Filed: Jun. 23, 2016

(65) Prior Publication Data

US 2016/0309300 A1 Oct. 20, 2016

Related U.S. Application Data

(63) Continuation of application No. PCT/CN2014/085399, filed on Aug. 28, 2014.

(30) Foreign Application Priority Data

Dec. 24, 2013 (CN) .......................... 201310719543.4

(51) Int. Cl.
*H04W 4/02* (2018.01)
*H04W 4/029* (2018.01)
(Continued)

(52) U.S. Cl.
CPC ........... *H04W 4/025* (2013.01); *H04W 4/023* (2013.01); *H04W 4/029* (2018.02); *H04W 8/16* (2013.01); *H04W 12/08* (2013.01); *H04W 64/00* (2013.01)

(58) Field of Classification Search
CPC ....... H04W 4/025; H04W 4/023; H04W 8/16; H04W 12/08; H04W 64/00; H04W 4/02; H04W 4/029
See application file for complete search history.

(56) References Cited

U.S. PATENT DOCUMENTS

2005/0202832 A1 9/2005 Sudit
2006/0223518 A1\* 10/2006 Haney ................. H04W 64/003
455/420

(Continued)

FOREIGN PATENT DOCUMENTS

CN 1592211 A 3/2005
CN 101194526 A 6/2008
(Continued)

OTHER PUBLICATIONS

Partial English Translation and Abstract of Chinese Patent Application No. CN1592211, Jul. 12, 2016, 9 pages.
(Continued)

*Primary Examiner* — Dinh Nguyen
(74) *Attorney, Agent, or Firm* — Conley Rose, P.C.

(57) ABSTRACT

A positioning method and a user equipment, where the positioning method includes determining, by a first user equipment, a positioning authorization condition for positioning a second user equipment, where the positioning authorization condition includes positioning time information or positioning location information that is jointly determined by the first user equipment and the second user equipment, positioning, by the first user equipment, the second user equipment under the positioning authorization condition, and obtaining location information of the second user equipment.

20 Claims, 9 Drawing Sheets

(51) Int. Cl.
*H04W 8/16* (2009.01)
*H04W 12/08* (2021.01)
*H04W 64/00* (2009.01)

(56) References Cited

U.S. PATENT DOCUMENTS

| | | | |
|---|---|---|---|
| 2006/0246920 A1 | 11/2006 | Shim | |
| 2007/0178915 A1 | 8/2007 | Khan | |
| 2008/0070593 A1 | 3/2008 | Altman et al. | |
| 2009/0187486 A1* | 7/2009 | Lefenfeld | G06Q 30/02 705/14.73 |
| 2010/0216491 A1* | 8/2010 | Winkler | G06Q 10/10 455/457 |
| 2010/0262360 A1* | 10/2010 | Hilliar Isaacson | G01C 21/20 701/532 |
| 2010/0274569 A1* | 10/2010 | Reudink | H04W 4/02 705/1.1 |
| 2011/0018732 A1* | 1/2011 | Cho | G01S 5/0236 340/8.1 |
| 2012/0058779 A1 | 3/2012 | Wang et al. | |
| 2013/0040665 A1* | 2/2013 | Lee | H04W 4/028 455/457 |
| 2013/0144522 A1* | 6/2013 | Irie | G01C 21/3667 701/430 |
| 2013/0288716 A1* | 10/2013 | Kwon | H04W 4/046 455/456.3 |
| 2013/0303190 A1* | 11/2013 | Khan | H04W 4/029 455/456.2 |
| 2014/0357269 A1* | 12/2014 | Zhou | H04W 76/023 455/434 |

FOREIGN PATENT DOCUMENTS

| | | |
|---|---|---|
| CN | 101232414 A | 7/2008 |
| CN | 101568067 A | 10/2009 |
| CN | 102883264 A | 1/2013 |
| CN | 103763768 A | 4/2014 |

OTHER PUBLICATIONS

Partial English Translation and Abstract of Chinese Patent Application No. CN101194526, Part 1, Jul. 12, 2016, 7 pages.
Partial English Translation and Abstract of Chinese Patent Application No. CN101194526, Part 2, Jul. 12, 2016, 4 pages.
Partial English Translation and Abstract of Chinese Patent Application No. CN103763768, Part 1, Jul. 12, 2016, 21 pages.
Partial English Translation and Abstract of Chinese Patent Application No. CN103763768, Part 2, Jul. 12, 2016, 7 pages.
Partial English Translation and Abstract of Chinese Patent Application No. CN102883264, Dec. 17, 2016, 23 pages.
Foreign Communication From A Counterpart Application, European Application No. 14874312.3, Extended European Search Report dated Sep. 14, 2016, 8 pages.
Foreign Communication From A Counterpart Application, Chinese Application No. 201310719543.4, Chinese Search Report dated May 23, 2016, 2 pages.
Foreign Communication From A Counterpart Application, Chinese Application No. 201310719543.4, Chinese Office Action dated Jun. 1, 2016, 5 pages.
Foreign Communication From A Counterpart Application, PCT Application No. PCT/CN2014/085399, English Translation of International Search Report dated Nov. 26, 2014, 2 pages.
Foreign Communication From A Counterpart Application, PCT Application No. PCT/CN2014/085399, English Translation of Written Opinion dated Nov. 26, 2014, 14 pages.

* cited by examiner

200

```
┌─────────────────────────────────────────────────┐
│ A second user equipment determines a positioning │
│ authorization condition for a first user equipment to position │
│ the second user equipment, where the positioning │  S210
│ authorization condition includes positioning time information │
│ or positioning location information that is jointly determined │
│ by the first user equipment and the second user equipment │
└─────────────────────────────────────────────────┘
                          │
                          ▼
┌─────────────────────────────────────────────────┐
│ The second user equipment sends location information of │
│ the second user equipment to the first user equipment │  S220
│ according to the positioning authorization condition │
└─────────────────────────────────────────────────┘
```

FIG. 7

```
┌─────────────────────────────────────────────────┐
│ The second user equipment receives a positioning request message │
│ sent by the first user equipment, where the positioning request │
│ message includes positioning request information, and the │
│ positioning request information includes positioning time request │  S211
│ information or positioning location request information for the │
│ first user equipment to request to position the second user │
│ equipment │
└─────────────────────────────────────────────────┘
                          │
                          ▼
┌─────────────────────────────────────────────────┐
│ The second user equipment determines, according to the │
│ positioning request message, the positioning authorization │
│ condition for the first user equipment to position the second user │
│ equipment, where the positioning authorization condition includes │  S212
│ the positioning time information or the positioning location │
│ information that is jointly determined by the first user equipment │
│ and the second user equipment │
└─────────────────────────────────────────────────┘
```

FIG. 8

POSITIONING METHOD AND USER EQUIPMENT

CROSS-REFERENCE TO RELATED APPLICATIONS

This application is a continuation of International Application No. PCT/CN2014/085399, filed on Aug. 28, 2014, which claims priority to Chinese Patent Application No. 201310719543.4, filed on Dec. 24, 2013, both of which are hereby incorporated by reference in their entireties.

TECHNICAL FIELD

Embodiments of the present disclosure relate to the field of communications, and in particular, to a positioning method and a user equipment.

BACKGROUND

In recent years, as user demands increase, a mobile positioning technology draws increasing attention, which promotes the development of the mobile positioning technology. The mobile positioning technology refers to a technology or a service of acquiring location information (for example, latitude and longitude coordinates) of a terminal using a positioning technology, and marking a location of a to-be-positioned object on an electronic map. A current positioning application generally supports positioning a current location of a user or positioning a determined place.

An existing map engine or map display program based on a mobile terminal such as a mobile phone, a tablet (e.g., an iPad®), or a notebook computer is always very complex, and real-time geographical location information between users is not shared directly enough. A current disclosed positioning technology about positioning another person has a relatively complex implementation method and is inconvenient to implement, and privacy of a to-be-positioned terminal is not fully considered in this technology such that a security level is relatively low.

Therefore, it needs to propose a positioning method for positioning another person that can be more conveniently applied and in which privacy of a to-be-positioned party needs to be considered when the other person is positioned.

SUMMARY

Embodiments of the present disclosure provide a positioning method and a user equipment, which can effectively protect security and privacy of a to-be-positioned user equipment when a positioning user equipment positions another person, and effectively improve user experience.

According to a first aspect, a positioning method is provided, where the positioning method includes determining, by a first user equipment, a positioning authorization condition for positioning a second user equipment, where the positioning authorization condition includes positioning time information or positioning location information that is jointly determined by the first user equipment and the second user equipment, and positioning, by the first user equipment, the second user equipment under the positioning authorization condition, and obtaining location information of the second user equipment.

With reference to the first aspect, in a first possible implementation manner of the first aspect, determining a positioning authorization condition for a first user equipment to position a second user equipment includes sending a positioning request message to the second user equipment, where the positioning request message includes positioning time request information or positioning location request information for the first user equipment to request to position the second user equipment, receiving a positioning request response message sent by the second user equipment, where the positioning request response message indicates positioning time response information or positioning location response information that is determined by the second user equipment according to the positioning request message, and determining, according to the positioning request response message, the positioning authorization condition for the first user equipment to position the second user equipment, where the positioning authorization condition includes the positioning time information that is jointly determined using the positioning time request information and the positioning time response information, or the positioning location information that is jointly determined using the positioning location request information and the positioning location response information.

With reference to the first aspect, in a second possible implementation manner of the first aspect, determining a positioning authorization condition for a first user equipment to position a second user equipment includes receiving a positioning request message sent by the second user equipment, where the positioning request message includes positioning time request information or positioning location request information for the second user equipment to request the first user equipment to position the second user equipment, and determining, according to the positioning request message, the positioning authorization condition for the first user equipment to position the second user equipment, where the positioning authorization condition includes the positioning time information or the positioning location information that is jointly determined by the first user equipment and the second user equipment.

With reference to the second possible implementation manner of the first aspect, in a third possible implementation manner of the first aspect, determining, by the first user equipment according to the positioning request message, the positioning authorization condition for the first user equipment to position the second user equipment includes determining that the positioning request message is the positioning authorization condition, or determining that a modified positioning request message is the positioning authorization condition, where a positioning range indicated by the positioning authorization condition does not exceed a positioning range indicated by the positioning request message.

With reference to the second possible implementation manner of the first aspect, in a fourth possible implementation manner of the first aspect, the positioning request message sent by the second user equipment further includes identifier information of the second user equipment, and determining, by the first user equipment according to the positioning request message, the positioning authorization condition for the first user equipment to position the second user equipment includes determining that the positioning request message is the positioning authorization condition when locally preset identifier information includes the identifier information included in the positioning request message.

With reference to the second possible implementation manner of the first aspect, in a fifth possible implementation manner of the first aspect, determining, according to the positioning request message, the positioning authorization condition for the first user equipment to position the second user equipment includes presenting first request information to a user, where the first request information indicates the positioning request message, receiving a user instruction, where the user instruction indicates the positioning authorization condition that is determined by the user according to the positioning request message, and determining the positioning authorization condition according to the user instruction.

With reference to the third or the fourth possible implementation manner of the first aspect, in a sixth possible implementation manner of the first aspect, the positioning method further includes presenting second request information to a user, where the second request information indicates the positioning authorization condition, receiving a user instruction, where the user instruction indicates a positioning authorization condition authorized by the user, and sending a positioning request response message to the second user equipment, where the positioning request response message includes the positioning authorization condition authorized by the user.

With reference to the fourth or the fifth possible implementation manner of the first aspect, in a seventh possible implementation manner of the first aspect, the positioning method further includes sending a positioning request response message to the second user equipment, where the positioning request response message includes the positioning authorization condition.

With reference to the first aspect or any implementation manner of the first to the seventh possible implementation manners of the first aspect, in an eighth possible implementation manner of the first aspect, the positioning the second user equipment according to the positioning authorization condition includes receiving geographical location information of the second user equipment that is sent by the second user equipment under the positioning authorization condition.

With reference to the eighth possible implementation manner of the first aspect, in a ninth possible implementation manner of the first aspect, the positioning method further includes sending a location information request message to the second user equipment, where the receiving geographical location information of the second user equipment that is sent by the second user equipment under the positioning authorization condition includes receiving the geographical location information of the second user equipment that is sent by the second user equipment based on the location information request message under the positioning authorization condition.

With reference to the seventh or the eighth possible implementation manner of the first aspect, in a tenth possible implementation manner of the first aspect, positioning the second user equipment according to the geographical location information includes sending a request message including the geographical location information to a server, where the request message is used to request the server to send map identifier location information obtained after matching is performed between the geographical location information and map information of the server, and receiving a request response message sent by the server, where the request response message includes the map identifier location information after the matching is performed between the geographical location information and the map information of the server.

With reference to the seventh or the eighth possible implementation manner of the first aspect, in an eleventh possible implementation manner of the first aspect, positioning the second user equipment according to the geographical location information includes performing matching on the geographical location information according to local map information, and determining the map identifier location information.

With reference to the first aspect or any implementation manner of the first to the seventh possible implementation manners of the first aspect, in a twelfth possible implementation manner of the first aspect, positioning the second user equipment according to the positioning authorization condition includes sending a request message including the identifier information of the second user equipment to a server, where the request message is used to request the location information of the second user equipment, and receiving a request response message sent by the server, where the request response message includes map identifier location information obtained after matching is performed between geographical location information of the second user equipment and map information of the server.

With reference to the first aspect or any implementation manner of the first to the seventh possible implementation manners of the first aspect, in a thirteenth possible implementation manner of the first aspect, positioning the second user equipment according to the positioning authorization condition includes receiving map identifier location information of the second user equipment that is sent by the second user equipment according to the positioning authorization condition, where the map identifier location information is information obtained after matching is performed between geographical location information of the second user equipment and map information.

With reference to any implementation manner of the tenth to the thirteenth possible implementation manners of the first aspect, in a fourteenth possible implementation manner of the first aspect, positioning the second user equipment according to the map identifier location information further includes displaying the map identifier location information of the second user equipment in a user interface (UI), or, broadcasting the map identifier location information of the second user equipment using voice, or, presenting the map identifier location information of the second user equipment using a short message service message.

According to a second aspect, a positioning method is provided, where the positioning method includes determining a positioning authorization condition for a first user equipment to position a second user equipment, where the positioning authorization condition includes positioning time information or positioning location information that is jointly determined by the first user equipment and the second user equipment, and sending location information of the second user equipment to the first user equipment according to the positioning authorization condition.

With reference to the second aspect, in a first possible implementation manner of the second aspect, determining a positioning authorization condition for a first user equipment to position a second user equipment includes sending a positioning request message to the first user equipment, where the positioning request message includes positioning time request information or positioning location request information for the second user equipment to request the first user equipment to position the second user equipment, receiving a positioning request response message sent by the first user equipment, where the positioning request response message indicates positioning time response information or positioning location response information that is determined by the first user equipment based on the positioning request message, and determining, according to the positioning request response message, the positioning authorization condition for the first user equipment to position the second user equipment, where the positioning authorization condition includes the positioning time information that is jointly determined using the positioning time request information and the positioning time response information, or the positioning location information that is jointly determined using the positioning location request information and the positioning location response information.

With reference to the second aspect, in a second possible implementation manner of the second aspect, determining a positioning authorization condition for a first user equipment to position a second user equipment includes receiving a positioning request message sent by the first user equipment, where the positioning request message includes positioning time request information or positioning location request information for the first user equipment to request to position the second user equipment, and determining, according to the positioning request message, the positioning authorization condition for the first user equipment to position the second user equipment, where the positioning authorization condition includes the positioning time information or the positioning location information that is jointly determined by the first user equipment and the second user equipment.

With reference to the second possible implementation manner of the second aspect, in a third possible implementation manner of the second aspect, determining, according to the positioning request message, the positioning authorization condition for the first user equipment to position the second user equipment includes determining that the positioning request message is the positioning authorization condition, or determining that a modified positioning request message is the positioning authorization condition.

With reference to the second possible implementation manner of the second aspect, in a fourth possible implementation manner of the second aspect, the positioning request message sent by the first user equipment further includes identifier information of the first user equipment, and determining, according to the positioning request message, the positioning authorization condition for the first user equipment to position the second user equipment includes determining that the positioning request message is the positioning authorization condition when locally preset identifier information includes the identifier information of the first user equipment.

With reference to the second possible implementation manner of the second aspect, in a fifth possible implementation manner of the second aspect, determining, according to the positioning request message, the positioning authorization condition for the first user equipment to position the second user equipment includes presenting first request information to a user, where the first request information indicates the positioning request message, receiving a user instruction, where the user instruction indicates the positioning authorization condition that is determined by the user according to the positioning request message, and determining the positioning authorization condition according to the user instruction.

With reference to the third or the fourth possible implementation manner of the second aspect, in a sixth possible implementation manner of the second aspect, the positioning method further includes presenting second request information to a user, where the second request information indicates the positioning authorization condition, receiving a user instruction, where the user instruction indicates a positioning authorization condition authorized by the user, and sending a positioning request response message to the first user equipment, where the positioning request response message includes the positioning authorization condition authorized by the user.

With reference to the fourth or the fifth possible implementation manner of the second aspect, in a seventh possible implementation manner of the second aspect, the positioning method further includes sending a positioning request response message to the first user equipment, where the positioning request response message includes the positioning authorization condition.

With reference to the second aspect or any implementation manner of the first to the sixth possible implementation manners of the second aspect, in a eighth possible implementation manner of the second aspect, sending location information of the second user equipment to the first user equipment according to the positioning authorization condition includes sending geographical location information to the first user equipment such that the first user equipment positions the second user equipment.

With reference to the second aspect or any implementation manner of the first to the sixth possible implementation manners of the second aspect, in an possible implementation manner of the first aspect, sending location information of the second user equipment to the first user equipment according to the positioning authorization condition includes determining map identifier location information according to geographical location information of the second user equipment, and sending the map identifier location information to the first user equipment such that the first user equipment positions the second user equipment.

With reference to the seventh or the eighth possible implementation manner of the second aspect, in a ninth possible implementation manner of the first aspect, the positioning method further includes receiving a location information request message sent by the first user equipment.

With reference to the eighth or the ninth possible implementation manner of the second aspect, in a tenth possible implementation manner of the first aspect, determining map identifier location information according to geographical location information of the second user equipment includes sending a request message including the geographical location information to a server, where the request message is used to request the server to send map identifier location information obtained after matching is performed between the geographical location information and map information of the server, receiving a request response message sent by the server, where the request response message includes the map identifier location information, and determining the map identifier location information according to the request response message.

With reference to the eighth or the ninth possible implementation manner of the second aspect, in an eleventh possible implementation manner of the first aspect, determining map identifier location information according to geographical location information of the second user equipment includes determining, according to local map information and the geographical location information, the map identifier location information obtained after matching is performed between the geographical location information and the local map information.

With reference to the second aspect or any implementation manner of the first to the sixth possible implementation manners of the second aspect, in a twelfth possible implementation manner of the first aspect, sending location information of the second user equipment to the first user equipment according to the positioning authorization condition includes receiving a location request message sent by a server, where the message includes identifier information of the second user equipment, and sending a location request response message to the server, where the location request response message includes geographical location information of the second user equipment such that the server sends, to the first user equipment, map identifier location information obtained after matching is performed between the geographical location information and map information of the server such that the first user equipment positions the second user equipment.

According to a third aspect, a first user equipment is provided, where the first user equipment includes a determining module configured to determine a positioning authorization condition for positioning a second user equipment, where the positioning authorization condition includes positioning time information or positioning location information that is jointly determined by the first user equipment and the second user equipment, and a positioning module configured to position the second user equipment according to the positioning authorization condition.

With reference to the third aspect, in a first possible implementation manner of the third aspect, the determining module includes a first sending unit configured to send a positioning request message to the second user equipment, where the positioning request message includes positioning time request information or positioning location request information for the first user equipment to request to position the second user equipment, a first receiving unit configured to receive a positioning request response message sent by the second user equipment, where the positioning request response message indicates positioning time response information or positioning location response information that is determined by the second user equipment according to the positioning request message, and a first determining unit configured to determine, according to the positioning request response message received by the first receiving unit, the positioning authorization condition for the first user equipment to position the second user equipment, where the positioning authorization condition includes the positioning time information that is jointly determined using the positioning time request information and the positioning time response information, or the positioning location information that is jointly determined using the positioning location request information and the positioning location response information.

With reference to the third aspect, in a second possible implementation manner of the third aspect, the determining module includes a second receiving unit configured to receive a positioning request message sent by the second user equipment, where the positioning request message includes positioning time request information or positioning location request information for the second user equipment to request the first user equipment to position the second user equipment, and a second determining unit configured to determine, according to the positioning request message received by the second receiving unit, the positioning authorization condition for the first user equipment to position the second user equipment.

With reference to the second possible implementation manner of the third aspect, in a third possible implementation manner of the third aspect, the second determining unit is further configured to determine that the positioning request message is the positioning authorization condition, or determine that a modified positioning request message is the positioning authorization condition, according to a locally preset positioning condition, where a positioning range indicated by the positioning authorization condition does not exceed a positioning range indicated by the positioning request message.

With reference to the second possible implementation manner of the third aspect, in a fourth possible implementation manner of the third aspect, the second determining unit is further configured to determine that the positioning request message is the positioning authorization condition when locally preset identifier information includes identifier information of the second user equipment that is included in the positioning request message received by the second receiving unit.

With reference to the second possible implementation manner of the third aspect, in a fifth possible implementation manner of the third aspect, the second determining unit further includes a presenting subunit configured to present first request information to a user, where the first request information indicates the positioning request message, a receiving subunit configured to receive a user instruction, where the user instruction indicates the positioning authorization condition that is determined by the user according to the positioning request message, and a determining subunit configured to determine the positioning authorization condition according to the user instruction received by the receiving subunit.

With reference to the third or the fourth possible implementation manner of the third aspect, in a sixth possible implementation manner of the third aspect, the user equipment further includes a presenting module configured to present second request information to a user, where the second request information indicates the positioning authorization condition, a receiving module configured to receive a user instruction, where the user instruction indicates a positioning authorization condition authorized by the user, and a first sending module configured to send a positioning request response message to the second user equipment, where the positioning request response message includes the positioning authorization condition authorized by the user and received by the receiving module.

With reference to the fourth or the fifth possible implementation manner of the third aspect, in a seventh possible implementation manner of the third aspect, the first user equipment further includes a second sending module configured to send a positioning request response message to the second user equipment, where the positioning request response message includes the positioning authorization condition determined by the second determining unit.

With reference to the third aspect or any possible implementation manner of the first to the seventh possible implementation manners of the third aspect, in an eighth possible implementation manner of the third aspect, the positioning module includes a third receiving unit configured to receive geographical location information of the second user equipment that is sent by the second user equipment under the positioning authorization condition.

With reference to the eighth possible implementation manner of the third aspect, in a ninth possible implementation manner of the third aspect, the first user equipment further includes a third sending unit configured to send a location information request message to the second user equipment, where the third receiving unit is configured to receive the geographical location information of the second user equipment that is sent by the second user equipment based on the location information request message under the positioning authorization condition.

With reference to the eighth or the ninth possible implementation manner of the third aspect, in a tenth possible implementation manner of the third aspect, the first positioning unit includes a fourth sending unit configured to send a request message including the geographical location information to a server, where the request message is used to request the server to send map identifier location information obtained after matching is performed between the geographical location information and map information of the server, where the third receiving unit is further configured to receive a request response message sent by the server, where the request response message includes the map identifier location information after the matching is performed between the geographical location information and the map information of the server.

With reference to the eighth or the ninth possible implementation manner of the third aspect, in an eleventh possible implementation manner of the third aspect, the positioning module includes a fourth determining unit configured to perform matching on the geographical location information according to local map information, and determine the map identifier location information.

With reference to the third aspect or any possible implementation manner of the first to the seventh possible implementation manners of the third aspect, in a twelfth possible implementation manner of the third aspect, the positioning module further includes a fifth sending unit configured to send a request message including the identifier information of the second user equipment to a server, where the request message is used to request the location information of the second user equipment, a fourth receiving unit configured to receive a request response message sent by the server, where the request response message includes map identifier location information obtained after matching is performed between geographical location information of the second user equipment and map information of the server, and a fifth determining unit configured to determine map identifier location information of the second user equipment according to the request response message received by the fourth receiving unit.

With reference to the third aspect or any possible implementation manner of the first to the seventh possible implementation manners of the third aspect, in a thirteenth possible implementation manner of the third aspect, the positioning module further includes a fifth receiving unit configured to receive map identifier location information of the second user equipment that is sent by the second user equipment under the positioning authorization condition, where the map identifier location information is information obtained after matching is performed between geographical location information of the second user equipment and map information.

With reference to any possible implementation manner of the tenth to the thirteenth possible implementation manners of the third aspect, in a fourteenth possible implementation manner of the third aspect, the positioning module further includes a display module configured to display the map identifier location information of the second user equipment in a UI, or a broadcasting module configured to broadcast the map identifier location information of the second user equipment using voice, or a presenting module configured to present the map identifier location information of the second user equipment using a short message service message.

According to a fourth aspect, a second user equipment is provided, where the second user equipment includes a determining module configured to determine a positioning authorization condition for a first user equipment to position the second user equipment, where the positioning authorization condition includes positioning time information or positioning location information that is jointly determined by the first user equipment and the second user equipment, and a sending module configured to send location information of the second user equipment to the first user equipment according to the positioning authorization condition determined by the determining module.

With reference to the fourth aspect, in a first possible implementation manner of the fourth aspect, the determining module includes a first sending unit configured to send a positioning request message to the first user equipment, where the positioning request message includes positioning request information, and the positioning request message includes positioning time request information or positioning location request information for the second user equipment to request the first user equipment to position the second user equipment, a first receiving unit configured to receive a positioning request response message sent by the first user equipment, where the positioning request response message indicates positioning time response information or positioning location response information that is determined by the first user equipment according to the positioning request message, and a first determining unit configured to determine, according to the positioning request response message received by the first receiving unit, the positioning authorization condition for the first user equipment to position the second user equipment, where the positioning authorization condition includes the positioning time information that is jointly determined using the positioning time request information and the positioning time response information, or the positioning location information that is jointly determined using the positioning location request information and the positioning location response information.

With reference to the fourth aspect, in a second possible implementation manner of the fourth aspect, the determining module includes a second receiving unit configured to receive a positioning request message sent by the first user equipment, where the positioning request message includes positioning request information, where the positioning request message includes positioning time request information or positioning location request information for the first user equipment to request to position the second user equipment, and a second determining unit configured to determine, according to the positioning request message received by the second receiving unit, the positioning authorization condition for the first user equipment to position the second user equipment, where the positioning authorization condition includes the positioning time information or the positioning location information that is jointly determined by the first user equipment and the second user equipment.

With reference to the second possible implementation manner of the fourth aspect, in a third possible implementation manner of the fourth aspect, the second determining unit is further configured to determine that the positioning request message is the positioning authorization condition, or determine that a modified positioning request message is the positioning authorization condition, according to a locally preset positioning condition.

With reference to the second possible implementation manner of the fourth aspect, in a fourth possible implementation manner of the fourth aspect, the second determining unit is further configured to determine that the positioning request message is the positioning authorization condition when locally preset identifier information includes identifier information of the first user equipment that is included in the positioning request message received by the second receiving unit.

With reference to the second possible implementation manner of the fourth aspect, in a fifth possible implementation manner of the fourth aspect, the second determining unit further includes a presenting subunit configured to present first request information to a user, where the first request information indicates the positioning request message, a receiving subunit configured to receive a user instruction, where the user instruction indicates the positioning authorization condition that is determined by the user according to the positioning request message, and a determining subunit configured to determine the positioning request authorization information according to the user instruction received by the receiving subunit.

With reference to the third or the fourth possible implementation manner of the fourth aspect, in a fifth possible implementation manner of the fourth aspect, the second user equipment further includes a presenting module configured to present second request information to a user, where the second request information indicates the positioning authorization condition included in the positioning request message sent by the first user equipment, and a receiving module configured to receive a user instruction, where the user instruction indicates a positioning authorization condition authorized by the user, where the sending module is further configured to send a positioning request response message to the first user equipment, where the positioning request response message includes the positioning authorization condition authorized by the user and received by the receiving module.

With reference to the fourth or the fifth possible implementation manner of the fourth aspect, in a sixth possible implementation manner of the fourth aspect, the sending module is further configured to send a positioning request response message to the first user equipment, where the positioning request response message includes the positioning authorization condition determined by the second determining unit.

With reference to the fourth aspect or any possible implementation manner of the first to the sixth possible implementation manners of the fourth aspect, in a seventh possible implementation manner of the fourth aspect, the sending module is further configured to send geographical location information to the first user equipment such that the first user equipment positions the second user equipment.

With reference to the fourth aspect or any possible implementation manner of the first to the sixth possible implementation manners of the fourth aspect, in an eighth possible implementation manner of the fourth aspect, the sending module includes a third determining unit configured to determine map identifier location information according to geographical location information of the second user equipment, and a second sending unit configured to send the map identifier location information to the first user equipment such that the first user equipment positions the second user equipment.

With reference to the seventh or the eighth possible implementation manner of the fourth aspect, in a ninth possible implementation manner of the fourth aspect, the sending module further includes a third receiving unit configured to receive a location information request message sent by the first user equipment.

With reference to the eighth or the ninth possible implementation manner of the fourth aspect, in a tenth possible implementation manner of the fourth aspect, the third determining unit includes a first sending subunit configured to send a request message including the geographical location information to a server, where the request message is used to request the server to send map identifier location information obtained after matching is performed between the geographical location information and map information of the server, a third receiving subunit configured to receive a request response message sent by the server, where the request response message includes the map identifier location information, and a second determining subunit configured to determine the map identifier location information according to the request response message received by the second receiving subunit.

With reference to the eighth or the ninth possible implementation manner of the fourth aspect, in an eleventh possible implementation manner of the fourth aspect, the third determining unit is further configured to determine, according to local map information and the geographical location information, the map identifier location information obtained after matching is performed between the geographical location information and the local map information.

With reference to the fourth aspect or any possible implementation manner of the first to the sixth possible implementation manners of the fourth aspect, in a twelfth possible implementation manner of the fourth aspect, the sending module further includes a fourth receiving unit configured to receive a location request message sent by a server, where the message includes identifier information of the second user equipment, and a third sending unit configured to send a location request response message to the server, where the location request response message includes geographical location information of the second user equipment such that the server sends, to the first user equipment, map identifier location information obtained after matching is performed between the geographical location information and map information of the server such that the first user equipment positions the second user equipment.

In conclusion, according to the positioning method and the user equipment in the embodiments of the present disclosure, a positioning user equipment and a to-be-positioned user equipment determine a positioning authorization condition through negotiation, and the positioning user equipment positions the to-be-positioned user equipment according to the positioning authorization condition such that privacy of the to-be-positioned user equipment can be effectively protected when the positioning user equipment positions another person, and user experience can be effectively improved.

BRIEF DESCRIPTION OF DRAWINGS

To describe the technical solutions in the embodiments of the present disclosure more clearly, the following briefly introduces the accompanying drawings required for describing the embodiments. The accompanying drawings in the following description show merely some embodiments of the present disclosure, and a person of ordinary skill in the art may still derive other drawings from these accompanying drawings without creative efforts.

FIG. 7 is a schematic flowchart of a positioning method according to another embodiment of the present disclosure;

FIG. 8 is a schematic flowchart of determining a positioning authorization condition according to another embodiment of the present disclosure;

DESCRIPTION OF EMBODIMENTS

The following clearly describes the technical solutions in the embodiments of the present disclosure with reference to the accompanying drawings in the embodiments of the present disclosure. The described embodiments are some but not all of the embodiments of the present disclosure. All other embodiments obtained by a person of ordinary skill in the art based on the embodiments of the present disclosure without creative efforts shall fall within the protection scope of the present disclosure.

Figure 1:
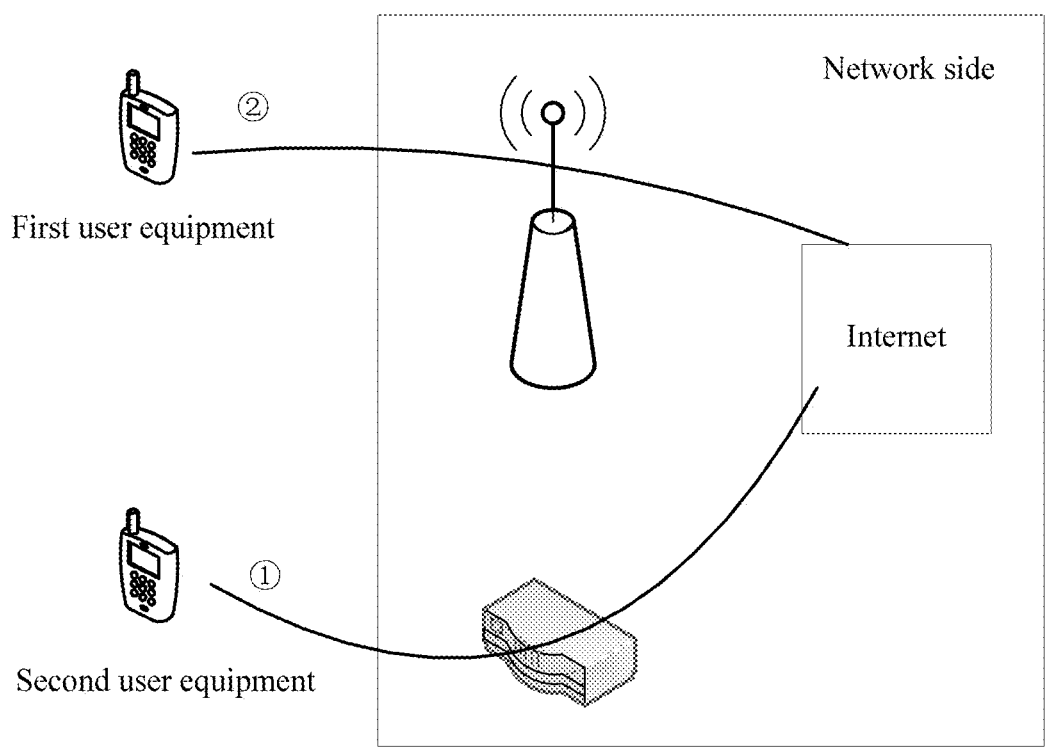
FIG. 1 is a schematic diagram of a communications system architecture in an application scenario according to an embodiment of the present disclosure.

For ease of understanding an application scenario of the technical solutions of the embodiments of the present disclosure, FIG. 1 shows a mobile communications network architecture, where the mobile communications network architecture supports data exchange or a voice call between a user equipment and multiple user equipments at the same time. For example, in FIG. 1, a first user equipment and a second user equipment may be connected to the Internet at a back end using a wired or wireless access network, and perform voice or data communication using networks to which the first user equipment and the second user equipment belong. An access network may be wired (for example, an access manner ① in FIG. 1), for example, an asymmetric digital subscriber line (ADSL), or may be wireless (for example, an access manner ② in FIG. 1), for example, a radio access network (RAN), and further, for example, a wireless local area network (WLAN). The Internet at the back end in the mobile communications network architecture can provide services such as positioning, navigation, and searching to a user equipment.

It should be understood that, the technical solutions of the embodiments of the present disclosure are applicable to various communications system, for example, a universal mobile telecommunications system (UMTS), a global system for mobile communications (GSM), a code division multiple access (CDMA) system, a wideband code division multiple access (WCDMA) system, a general packet radio service (GPRS) system, a long term evolution (LTE) system, and the like.

Figure 2:
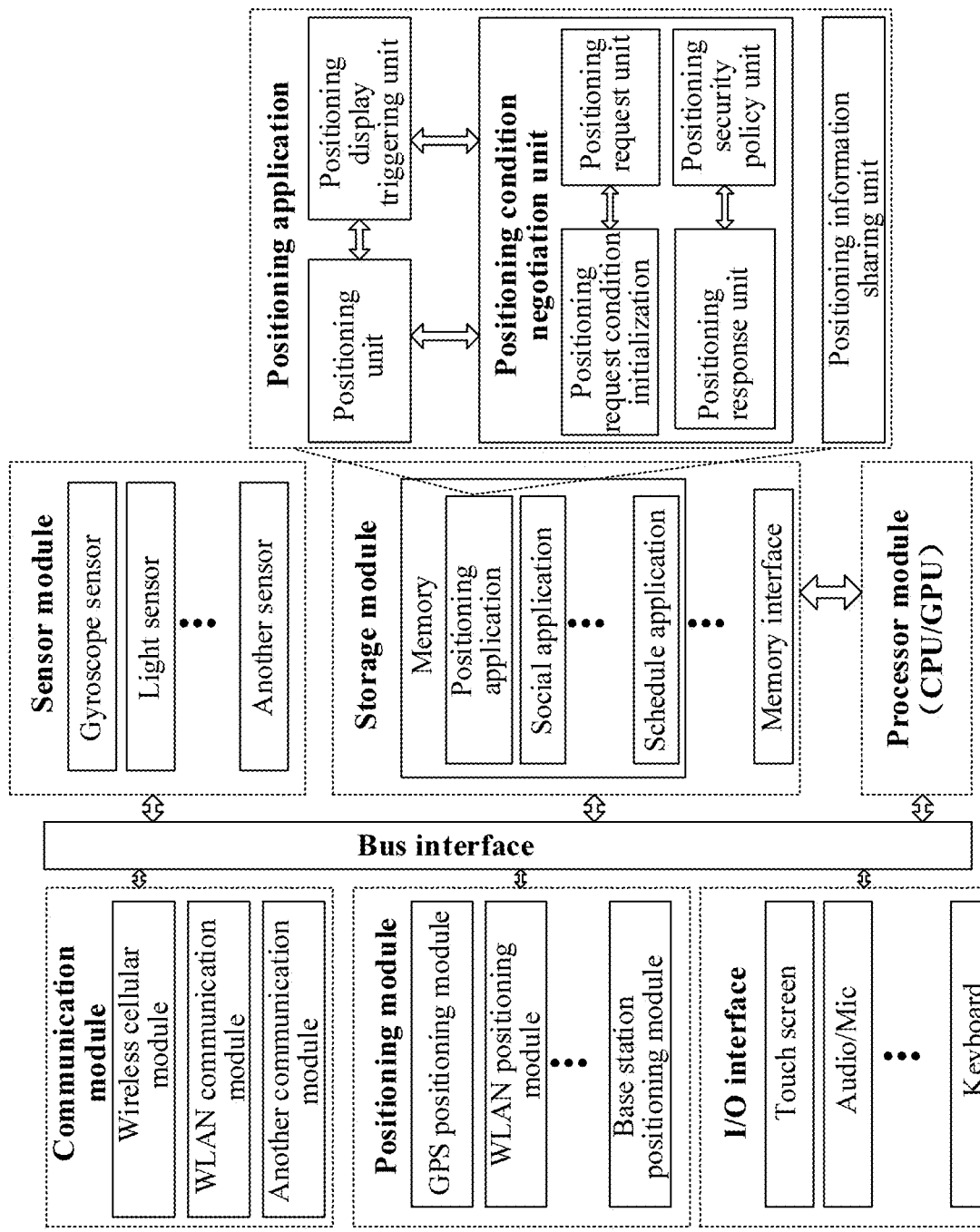
FIG. 2 is a diagram of a system architecture of a user equipment according to an embodiment of the present disclosure.

FIG. 2 is a structural diagram of a system of a typical user equipment with a positioning function according to an embodiment of the present disclosure. As shown in FIG. 2, the user equipment includes a communication module, a positioning module, an input/output (I/O) interface module, a sensor module, a storage module, and a processor module, and these modules are connected and mutually communicate using a bus interface, to implement various functions and applications on the user equipment. The communication module enables the user equipment to establish a communication connection to another user equipment in a cellular network, or using a WLAN, or in another communication manner. The positioning module can obtain, through positioning, current geographical location information of the user equipment using a global positioning system (GPS), a base station, or a WLAN, or in another manner. The I/O interface module may receive an input through a touchscreen of the user equipment, a voice input, or an input through a keyboard. After the processor module obtains by parsing out a command, a response application program in a memory is invoked, to execute an operation command of a user, and present an operation result to the user using the screen or using voice. The sensor module may collect various types of data needed by different applications. For example, a gyroscope module can help the positioning module to further improve accuracy. The storage module stores and runs multiple pieces of application software on a mobile phone, such as WECHAT used for social communication, an assistant application used for schedules, GOOGLE map used for positioning, and AUTONAVI navigation used for navigation. Optionally, a positioning method in an embodiment of the present disclosure may be performed by such an application service stored in the memory. The processor module is configured to parse, process, and calculate all data on the mobile phone, especially a communication and calculation instruction stored in the memory.

It should be understood that, in the embodiments of the present disclosure, a user equipment may be further referred to as a terminal, a mobile station, a mobile terminal, or the like. The user equipment may have any terminal with a positioning function shown in FIG. 2, for example, may be a smart mobile phone (or referred to as a "cellular" phone), a computer with a smart mobile terminal, any portable, pocket-sized, handheld, wearable, computer built-in, or in-vehicle mobile apparatus with a positioning function, for example, a camera with a positioning function, or any mobile terminal with a positioning demand.

Figure 3:
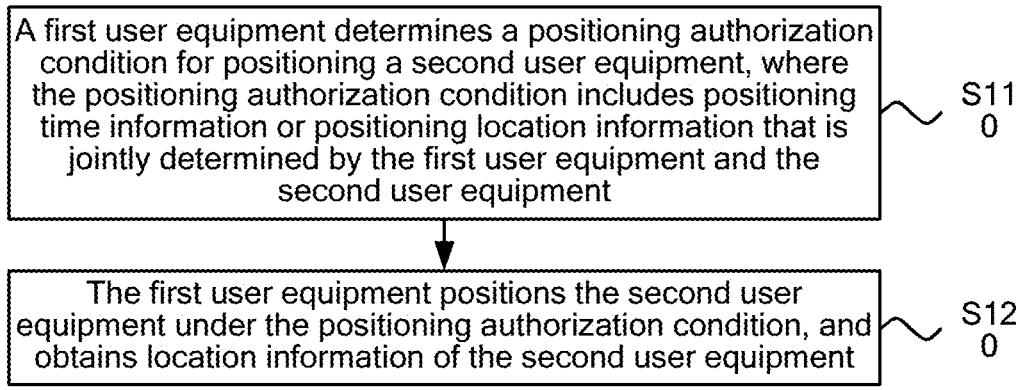
FIG. 3 is a schematic flowchart of a positioning method according to an embodiment of the present disclosure.

FIG. 3 shows a positioning method 100 according to an embodiment of the present disclosure, and the method, for example, is performed by a first user equipment. As shown in FIG. 3, the method 100 includes the following steps.

Step S110: A first user equipment determines a positioning authorization condition for positioning a second user equipment, where the positioning authorization condition includes positioning time information or positioning location information that is jointly determined by the first user equipment and the second user equipment.

Step S120: The first user equipment positions the second user equipment under the positioning authorization condition, and obtains location information of the second user equipment.

The first user equipment positions the second user equipment according to the positioning authorization condition that is jointly determined by the first user equipment and the second user equipment. The positioning authorization condition includes the positioning time information or the positioning location information, where the positioning time information may be one or more time points, one or more time periods, or other time information, that is, the positioning time information indicates a positioning time range, and the positioning location information may be positioning start point location information, positioning termination point location information, or other location information, that is, the positioning location information indicates a positioning region range.

Therefore, according to the positioning method in this embodiment of the present disclosure, a positioning user equipment positions a to-be-positioned user equipment according to a positioning authorization condition that is determined by the positioning user equipment and the to-be-positioned user equipment through negotiation such that privacy of the to-be-positioned user equipment can be effectively protected when the positioning user equipment positions another person, and user experience can be effectively improved.

It should be understood that, the positioning authorization condition that is jointly determined by the first user equipment and the second user equipment includes the positioning time information or the positioning location information or include both the positioning time information and the positioning location information, where the positioning time information, for example, may be a specific time period or a specific time point, and the positioning location information may be the positioning start point location information, the positioning termination point location information, or specific landmark information. It should be understood that, the positioning authorization condition may be the positioning time information, the positioning location information, or both the positioning time information and the positioning location information. Furthermore, when the positioning authorization condition is the positioning time information, the first user equipment positions the second user equipment within a time range indicated by the positioning time information or at a specific time point indicated by the positioning time information. For example, the positioning authorization condition is 9:00 to 10:00, that is, the first user equipment positions the second user equipment in a time period 9:00 to 10:00. For another example, the positioning authorization condition is a time point 14:00, that is, the first user equipment positions the second user equipment at 14:00, or keeps positioning the second user equipment starting from a positioning start moment until 14:00, or keeps positioning the second user equipment starting from 14:00 until a positioning procedure ends. It should be understood that, in an implementation process, a specific positioning policy to be used may be preconfigured by a system or may be configured by a user temporarily, which is not limited in this embodiment of the present disclosure. For another example, when the positioning authorization condition is 30 minutes, the first user equipment may start to position the second user equipment from a current moment and keep positioning for 30 minutes until the positioning ends. It should be understood that, the positioning time information may also be multiple nonconsecutive time periods or points. When the positioning authorization condition is the positioning location information, the first user equipment positions the second user equipment within the region range indicated by the positioning location information. For example, when the positioning authorization condition is the positioning termination point location information, the first user equipment starts to perform positioning at a current location of the second user equipment and ends at the termination point location. For another example, when the positioning authorization condition is the positioning start point location information, the first user equipment keeps positioning the second user equipment starting from the positioning start point location, and when the first user equipment and the second user equipment specify a destination, positioning may be kept from the positioning start point location to the specified destination. When the positioning authorization condition includes the positioning location information and the positioning time information, for example, the positioning authorization condition is positioning start location information and 1 hour, the first user equipment starts to position the second user equipment from a location indicated by the positioning start location information, and keeps the positioning for 1 hour. In conclusion, the positioning authorization condition determines a specific time range and a region range for the first user equipment to position the second user equipment, and the positioning authorization condition is determined by the first user equipment and the second user equipment through negotiation such that privacy of the second user equipment can be fully protected when the first user equipment positions the second user equipment according to a requirement of the first user equipment, and user experience can be effectively improved.

In step S110, the first user equipment negotiates with the second user equipment to determine the positioning authorization condition for positioning the second user equipment. There may be two methods for determining the positioning authorization condition. One is that the first user equipment initiates, to the second user equipment, a positioning request for requesting to position the second user equipment, and the first user equipment negotiates with the second user equipment to determine the positioning authorization condition, and the other is that the second user equipment initiates, to the first user equipment, a positioning request for requesting the first user equipment to position the second user equipment, which are described in detail below with reference to FIG. 4 and FIG. 5.

In this embodiment of the present disclosure, optionally, determining a positioning authorization condition for a first user equipment to position a second user equipment includes the following steps.

Step S111: The first user equipment receives a positioning request message sent by the second user equipment, where the positioning request message includes positioning request information, and the positioning request information includes positioning time request information or positioning location request information for the second user equipment to request the first user equipment to position the second user equipment.

Step S112: The first user equipment determines, according to the positioning request message, the positioning authorization condition for the first user equipment to position the second user equipment, where the positioning authorization condition includes the positioning time information or the positioning location information that is jointly determined by the first user equipment and the second user equipment.

It should be understood that, that the positioning request message includes the positioning request information is an implementation manner, and, in implementation, the positioning request message may directly include the positioning time request information or the positioning location request information for the second user equipment to request the first user equipment to position the second user equipment. Therefore, a structure of the positioning request information may not exist, and in this embodiment, the positioning request information may also be understood as the positioning request message.

Figure 4:
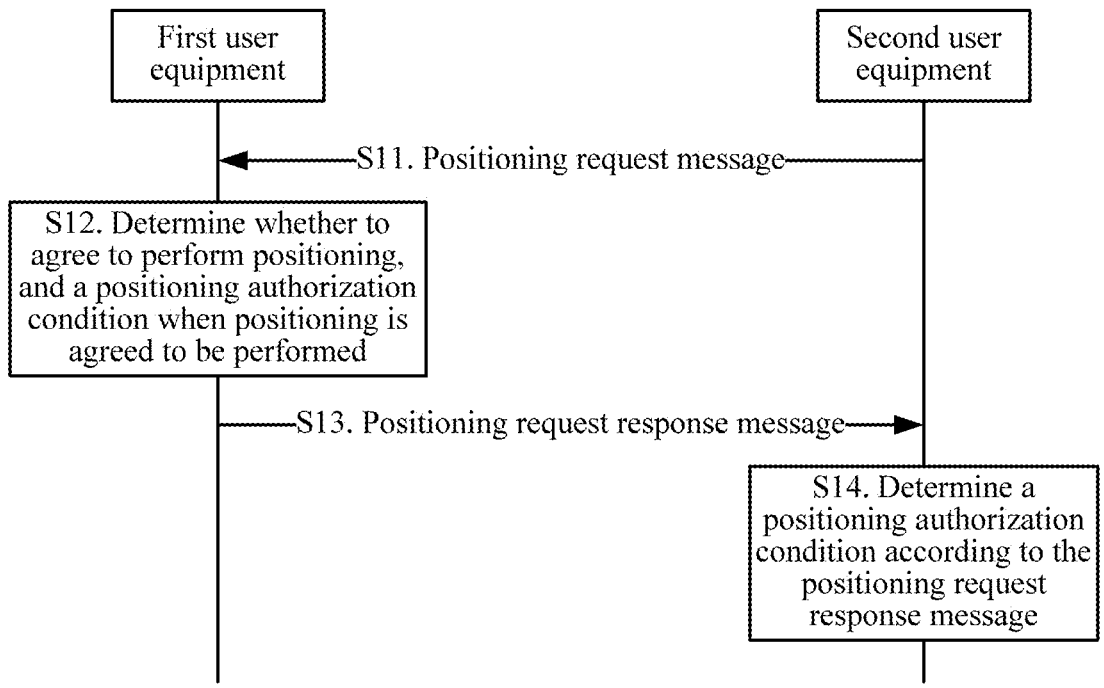
FIG. 4 is a schematic flowchart of determining a positioning authorization condition according to an embodiment of the present disclosure.

Furthermore, as shown in FIG. 4, in step S11, the second user equipment sends a positioning request message to the first user equipment, where the positioning request message includes positioning request information, that is, the positioning request message is used to request the first user equipment to position the second user equipment under the positioning request information, and in step S12, the first user equipment determines, according to the received positioning request message, whether to agree to perform positioning, and a positioning authorization condition when positioning is agreed to be performed.

In step S11, the second user equipment sends the positioning request message to the first user equipment, where the positioning request information included in the positioning request message may be positioning time request information or positioning location request information, where the positioning time request information may be a time point or a time period, and the positioning location request information may be positioning start location information, positioning termination point location information, or specific landmark information, or the like. The positioning request message may further include identifier information of the second user equipment or the first user equipment, which, for example, may be a user name, a telephone number, or the like of the second user equipment or the first user equipment, or device type information or the like of the second user equipment or the first user equipment.

In step S12, the first user equipment determines, according to the received positioning request message, whether to agree to perform positioning, and the positioning authorization condition when positioning is agreed to be performed. Furthermore, the first user equipment may perform, using a locally preset positioning condition, matching on the positioning time request information or the positioning location request information that is included in the positioning request message, to determine the positioning authorization condition, and present the positioning authorization condition to a user, and the user finally determines the positioning authorization condition. Alternatively, the first user equipment may directly feedback the positioning request information to a user, and determine the positioning authorization condition by completely relying on a user instruction. Alternatively, the first user equipment may locally preset a high-priority user identifier information list, for example, a white list, the first user equipment may automatically perform matching between identifier information of the second user equipment that actively initiates the positioning request and the high-priority user identifier information list, and when the high-priority user identifier information list includes the second user equipment, the first user equipment may directly return, without a user instruction, an acknowledgement message indicating that positioning and tracking are allowed. The following describes in detail a procedure and a method for determining, by the first user equipment, the positioning authorization condition according to the positioning request message.

Optionally, in this embodiment of the present disclosure, determining, by the first user equipment according to the positioning request message, the positioning authorization condition for the first user equipment to position the second user equipment includes determining that the positioning request information included in the positioning request message is the positioning authorization condition, or determining that modified positioning request information is the positioning authorization condition, where a positioning range indicated by the positioning authorization condition does not exceed a positioning range indicated by the positioning request information.

The first user equipment may determine the positioning authorization condition according to the locally preset positioning condition, where the locally preset positioning condition may be some rough security policies, for example, simply, being positioned is allowed, being positioned is not allowed, being positioned is allowed in a time period, being positioned is allowed at a time point, or being positioned is allowed within a region range, or may be some indication information, for example, when the positioning request information meets a specific condition, being positioned is allowed within a specific time or region range. After being positioned is allowed, the positioning authorization condition may be directly determined according to the positioning request information or may be set according to the locally preset positioning condition, and after the positioning request information is modified, it is determined that the modified positioning request information is the positioning authorization condition. It should be understood that, the locally preset positioning condition may be preconfigured by a system of the first user equipment or may be set at any time anywhere by a user, and specific content of the locally preset positioning condition is not limited in this embodiment of the present disclosure, as long as the positioning authorization condition can be determined using the locally preset positioning condition.

Optionally, in this embodiment of the present disclosure, after determining the positioning authorization condition, the first user equipment may further send a positioning request response message to the second user equipment, where the positioning request response message indicates the positioning authorization condition. Furthermore, as shown in FIG. 4, in step S13, the first user equipment sends a positioning request response message to the second user equipment, where the positioning request response message indicates the positioning authorization condition, and in step S14, the second user equipment determines the positioning authorization condition according to the positioning request response message.

In this embodiment of the present disclosure, after determining the positioning authorization condition according to the locally preset positioning condition, the first user equipment further needs to present, to a user of the first user equipment, the positioning authorization condition or indication information indicating the positioning authorization condition, and finally determines, according to a user instruction, whether to allow the positioning request of the second user equipment, and a positioning authorization condition when positioning is allowed to be performed.

In this embodiment of the present disclosure, optionally, the positioning method further includes presenting second request information to a user, where the second request information indicates the positioning authorization condition, receiving a user instruction, where the user instruction indicates a positioning authorization condition authorized by the user, and sending a positioning request response message to the second user equipment, where the positioning request response message includes the positioning authorization condition authorized by the user.

It should be understood that, a specific presenting manner may be voice broadcasting. For example, in a process in which a user drives a car or the like, or when a user uses a wearable device such as a SMART WATCH, the presenting manner may be directly displaying in a UI, or the user is notified using a short message service message, and a system program of the first user equipment may further determine, based on a local policy and acquired information, a manner for presenting to the user, which is not limited in this embodiment of the present disclosure.

It should be further understood that, in addition to presenting the determined positioning authorization condition to the user, the first user equipment may also present, to the user, a suggestion such as how to modify the positioning request information.

After receiving the user instruction, the first user equipment sends the positioning request response message to the second user equipment, where the positioning request response message includes the positioning authorization condition authorized by the user. If the user does not agree on the positioning request of the second user equipment, the positioning request response message may include indication information indicating that positioning is not agreed to be performed, or directly, any response message is not sent to the second user equipment.

In this embodiment of the present disclosure, optionally, the positioning request message sent by the second user equipment further includes identifier information of the second user equipment, and determining, by the first user equipment according to the positioning request message, the positioning authorization condition for the first user equipment to position the second user equipment includes determining that the positioning request information is the positioning authorization condition when locally preset identifier information includes the identifier information included in the positioning request message.

The identifier information of the second user equipment may be a user name or a telephone number of the second user equipment, a device type, or any other information that can represent a feature of the second user equipment.

The locally preset identifier information may be a contact list locally stored in the first user equipment, a credible positioning contact list preset in the first user equipment, a user equipment type, or any preset information that limits a positioning user equipment or a positioning user. For example, the locally preset identifier information is a credible positioning contact list locally stored in the first user equipment, and when the user name of the second user equipment that initiates the positioning request is in the credible positioning contact list, the positioning request of the second user equipment is allowed, and the positioning request information may be directly used as the positioning authorization condition.

In this embodiment of the present disclosure, after determining the positioning authorization condition according to the locally preset identifier information, the first user equipment also needs to present, to the user of the first user equipment, the positioning authorization condition or the indication information indicating the positioning authorization condition, and finally determines, according to the user instruction, whether to allow the positioning request of the second user equipment, and the positioning authorization condition when positioning is allowed to be performed.

The locally preset identifier information of the first user equipment may also be high-priority positioning user identifier information, for example, a "positioning white list", and when a user of the second user equipment that initiates the positioning request is in the "positioning white list", the positioning request information may be directly used as the positioning authorization condition, and a positioning request response message may be directly sent to the second user equipment, where the positioning request response message indicates the positioning authorization condition. In this embodiment of the present disclosure, the first user equipment may not rely on a user instruction but directly feedback a positioning request response message to the second user equipment. The first user equipment may further locally set low-level user identifier information, for example, a "positioning blacklist", and directly reject the positioning request of the second user equipment when determining that the identifier information of the second user equipment is in the "positioning blacklist".

In addition to first determining the positioning authorization condition according to the locally preset positioning condition or the locally preset identifier information, and then, presenting the positioning authorization condition to the user, and determining, according to the user instruction, the positioning authorization condition authorized by the user, the first user equipment may also completely rely on a UI input feedback of the user.

In this embodiment of the present disclosure, optionally, determining, by the first user equipment according to the positioning request message, the positioning authorization condition for the first user equipment to position the second user equipment includes presenting first request information to a user, where the first request information indicates positioning request information included in the positioning request message, receiving a user instruction, where the user instruction indicates the positioning authorization condition that is determined by the user according to the positioning request information, and determining the positioning authorization condition according to the user instruction.

In addition to presenting the positioning request information to the user, the first user equipment may further automatically obtain through matching, according to the identifier information of the second user equipment that is included in the positioning request message, contact-related information in the locally stored contact list that is corresponding to the identifier information, such as a nickname and remark information such that the user can determine whether to agree to position the second user equipment under the positioning request information.

Furthermore, the first user equipment presents, to the user, the positioning request information in the positioning request message or indication information indicating the positioning request information, a specific presenting manner may also be voice broadcasting For example, in a process in which a user drives a car or the like, or when a user uses a wearable device such as a smart watch, the presenting manner may be directly displaying in a UI, or the user is notified using a short message service message, and a system program of the first user equipment may further determine, based on a local policy and acquired information, a manner for presenting to the user, which is not limited in this embodiment of the present disclosure. It should be further understood that, in addition to presenting the determined positioning authorization condition to the user, the first user equipment may also present, to the user, a suggestion such as how to modify the positioning request information.

After the first user equipment receives the user instruction, further, as shown in step S13 in FIG. 4, the first user equipment sends a positioning request response message to the second user equipment, where the positioning request response message indicates a positioning authorization condition indicated by the user instruction, and in step S14, the second user equipment determines the positioning authorization condition according to the positioning request response message. It should be understood that, if the user does not agree on the positioning request of the second user equipment, the positioning request response message may include indication information indicating that positioning is not agreed to be performed, or directly, any response message is not sent to the second user equipment.

In step S110, the first user equipment negotiates with the second user equipment to determine the positioning authorization condition for positioning the second user equipment, and a method for determining the positioning authorization condition may be that the first user equipment initiates, to the second user equipment, a positioning request for requesting to position the second user equipment, and the first user equipment negotiates with the second user equipment to determine the positioning authorization condition.

Optionally, in this embodiment of the present disclosure, determining, by a first user equipment, a positioning authorization condition for positioning a second user equipment includes the following steps.

Step S113: The first user equipment sends a positioning request message to the second user equipment, where the positioning request message includes positioning request information, and the positioning request information includes positioning time request information or positioning location request information for the first user equipment to request to position the second user equipment.

Step S114: The first user equipment receives a positioning request response message sent by the second user equipment, where the positioning request response message indicates the positioning authorization condition that is determined by the second user equipment according to the positioning request message, and the positioning authorization condition includes positioning time response information or positioning location response information that is jointly determined by the first user equipment and the second user equipment.

Step S115: The first user equipment determines, according to the positioning request response message, the positioning authorization condition for the first user equipment to position the second user equipment, where the positioning authorization condition includes the positioning time information that is jointly determined using the positioning time request information and the positioning time response information, or the positioning location information that is jointly determined using the positioning location request information and the positioning location response information.

It should be understood that, that the positioning request message includes the positioning request information is an implementation manner, and, in implementation, the positioning request message may directly include the positioning time request information or the positioning location request information for the second user equipment to request the first user equipment to position the second user equipment. Therefore, a structure of the positioning request information may not exist, and in this embodiment, the positioning request information may also be understood as the positioning request message.

Figure 5:
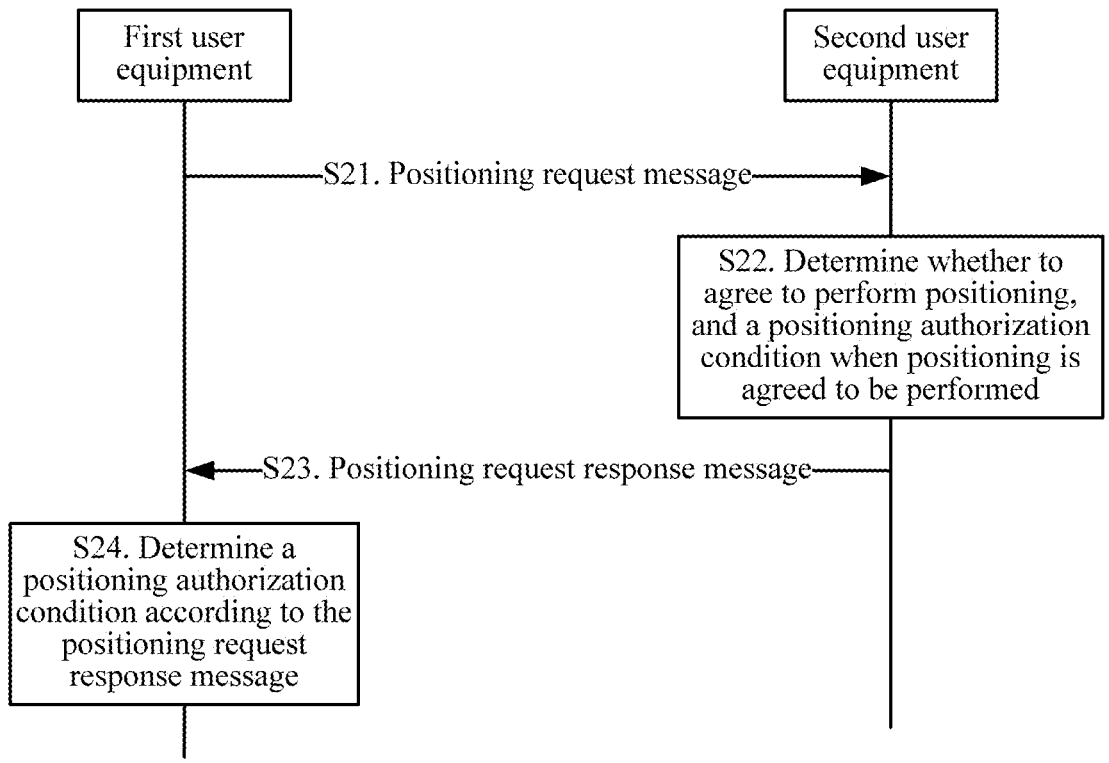
FIG. 5 is another schematic flowchart of determining a positioning authorization condition according to an embodiment of the present disclosure.

Further, as shown in FIG. 5, in step S21, the first user equipment sends a positioning request message to the second user equipment, where the positioning request message includes positioning request information, that is, the positioning request message is used to request to position the second user equipment according to the positioning request information. In step S22, the second user equipment determines, according to the received positioning request message, whether to agree to perform positioning, and a positioning authorization condition when positioning is agreed to be performed. In step S23, the second user equipment sends a positioning request response message to the first user equipment, where the positioning request response message indicates the positioning authorization condition, and in step S24, the first user equipment determines the positioning authorization condition according to the positioning request response message.

In step S21, the positioning request message sent by the first user equipment may further include identifier information of the first user equipment or the second user equipment, which, for example, may be a user name, a telephone number, or the like of the second user equipment or the first user equipment, or device type information or the like of the second user equipment or the first user equipment.

In step S22, a specific procedure and a method for determining, by the second user equipment according to the received positioning request message, whether to agree to perform positioning, and a positioning authorization condition when positioning is agreed to be performed are described in detail below.

With reference to FIG. 4 and FIG. 5, the foregoing describes in detail a procedure and a method for negotiating, by the first user equipment with the second user equipment to determine the positioning authorization condition. Formats of the positioning request message and the positioning request response message exchanged between the first user equipment and the second user equipment may be short message service message, or data packet.

Therefore, according to the positioning method in this embodiment of the present disclosure, a positioning user equipment positions a to-be-positioned user equipment according to a positioning authorization condition that is determined by the positioning user equipment and the to-be-positioned user equipment through negotiation such that privacy of the to-be-positioned user equipment can be effectively protected when the positioning user equipment positions another person, and user experience can be effectively improved.

Figure 6A:
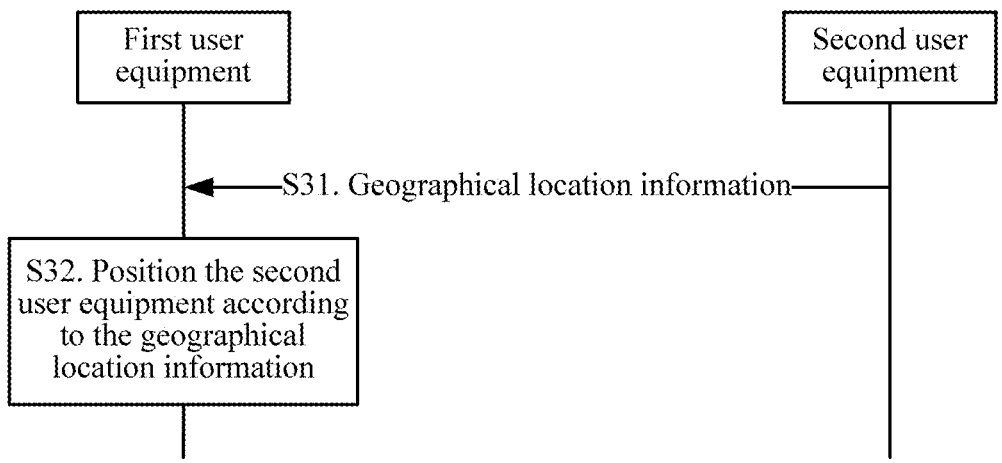
FIG. 6A, FIG. 6B, and FIG. 6C are schematic flowcharts of three positioning methods according to an embodiment of the present disclosure.
Figure 6B:
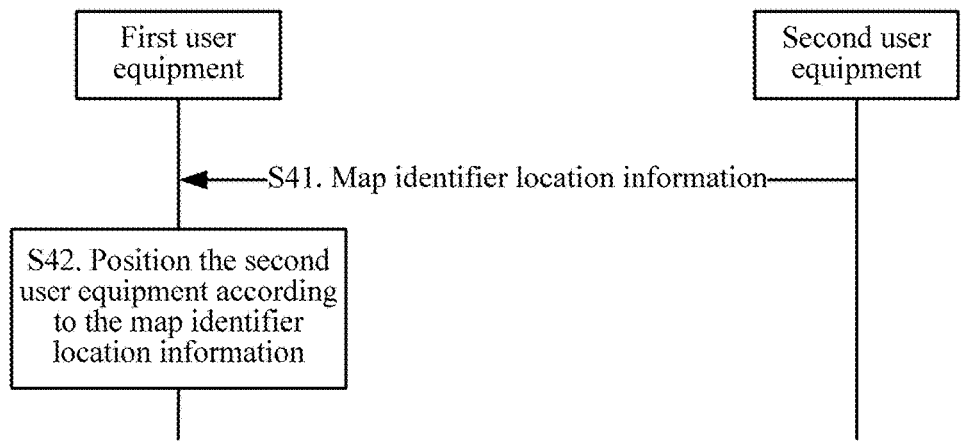
Figure 6C:
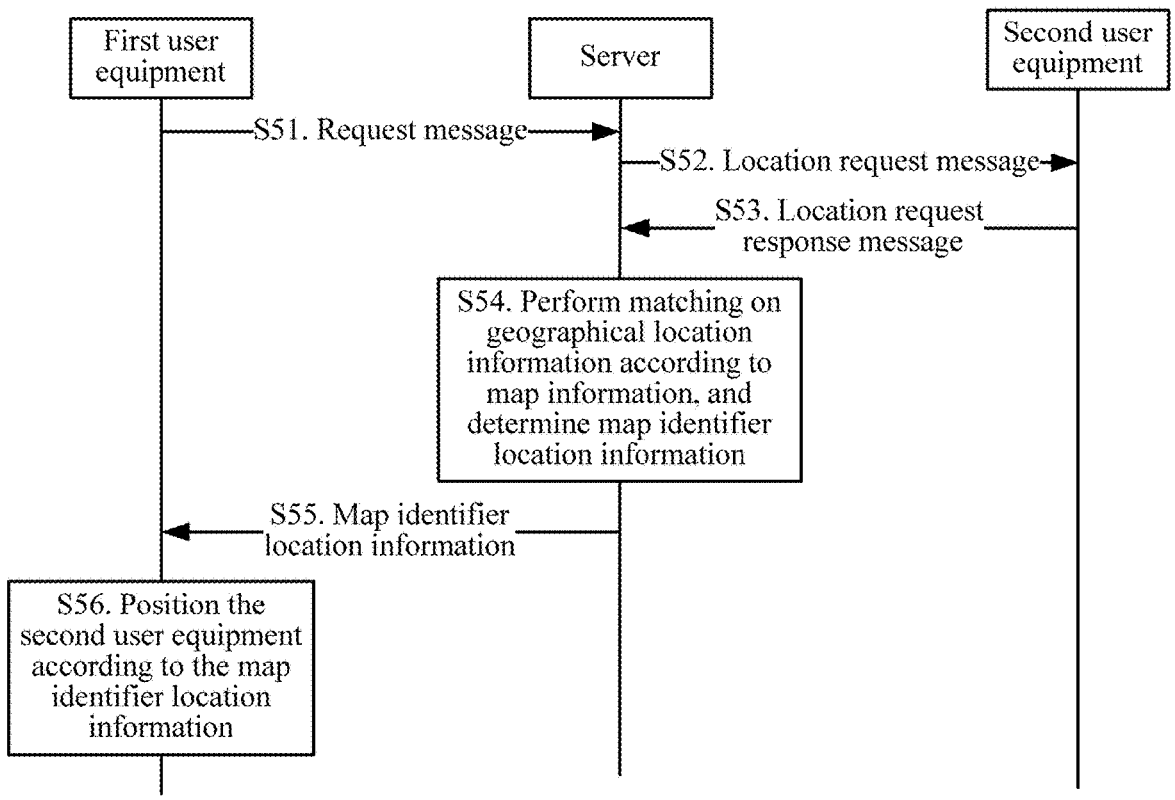

In step S120, the first user equipment positions the second user equipment according to the positioning authorization condition determined with the second user equipment through negotiation, that is, the first user equipment acquires the location information of the second user equipment within the time range or the region range indicated by the positioning authorization condition, and may further map the location information of the second user equipment to an electronic map, and may further display location information of the first user equipment on the electronic map at the same time. With reference to FIG. 6A, FIG. 6B, and FIG. 6C, the following describes in detail that the first user equipment acquires the location information of the second user equipment.

In this embodiment of the present disclosure, optionally, positioning, by the first user equipment, the second user equipment under the positioning authorization condition, and obtaining location information of the second user equipment includes receiving, by the first user equipment, geographical location information of the second user equipment that is sent by the second user equipment according to the positioning authorization condition.

Furthermore, as shown in FIG. 6A, in step S31, the second user equipment sends geographical location information to the first user equipment, and in step S32, the first user equipment positions the second user equipment according to the geographical location information.

The geographical location information of the second user equipment indicates actual physical location information of the second user equipment, for example, may be GPS location information (a longitude, a latitude, and a height). The first user equipment may perform matching on the geographical location information to the electronic map to determine map identifier location information, to position the second user equipment in real time, or may perform matching on the geographical location information to another coordinate system, such as a three-dimensional geodetic coordinate system, to position the second user equipment.

In step S32, the first user equipment positions the second user equipment according to the geographical location information, and further, the first user equipment may perform matching on the geographical location information to the electronic map to determine the map identifier location information, to position the second user equipment in real time, may send the geographical location information to a backend server to determine the map identifier location information, or may determine the map identifier location information according to local map information.

In this embodiment of the present disclosure, optionally, the positioning method further includes sending, by the first user equipment, a request message including the geographical location information to a server, where the request message is used to request the server to send map identifier location information obtained after matching is performed between the geographical location information and map information of the server, receiving, by the first user equipment, a request response message sent by the server, where the request response message includes the map identifier location information after matching is performed between the geographical location information and the map information of the server, and determining, by the first user equipment, map identifier location information of the second user equipment according to the request response message.

Optionally, in this embodiment of the present disclosure, the positioning method further includes performing, by the first user equipment, matching on the geographical location information according to local map information, and determining map identifier location information of the second user equipment.

The first user equipment may also directly receive real-time map identifier location information of the second user equipment that is sent by the second user equipment.

In this embodiment of the present disclosure, optionally, positioning, by the first user equipment, the second user equipment under the positioning authorization condition, and obtaining location information of the second user equipment includes receiving, by the first user equipment, map identifier location information of the second user equipment that is sent by the second user equipment according to the positioning authorization condition, where the map identifier location information is information obtained after matching is performed between geographical location information of the second user equipment and map information.

Further, as shown in FIG. 6B, in step S41, the second user equipment sends map identifier location information of the second user equipment to the first user equipment, and in step S42, the first user equipment positions the second user equipment according to the map identifier location information.

It should be understood that, before the first user equipment passively receives the location information sent by the second user equipment, the first user equipment may also actively send a location information request message to the second user equipment.

Optionally, in this embodiment of the present disclosure, before receiving, by the first user equipment, geographical location information of the second user equipment that is sent by the second user equipment according to the positioning authorization condition, the positioning method further includes sending, by the first user equipment, a location information request message to the second user equipment.

The first user equipment may further directly request the map identifier location information of the second user equipment from the backend server according to the positioning authorization condition.

In this embodiment of the present disclosure, optionally, positioning, by the first user equipment, the second user equipment under the positioning authorization condition, and obtaining location information of the second user equipment includes sending, by the first user equipment, a request message including the identifier information of the second user equipment to a server, where the request message is used to request the location information of the second user equipment, receiving a request response message sent by the server, where the request response message includes map identifier location information obtained after matching is performed between geographical location information of the second user equipment and map information of the server, and determining map identifier location information of the second user equipment according to the request response message.

Further, as shown in FIG. 6C, in step S51, the first user equipment sends a request message including identifier information of the second user equipment to a server. In step S52, the server sends a location request message including the identifier information of the second user equipment to the second user equipment. In step S53, the second user equipment sends a location request response message to the server, where the location request response message includes geographical location information of the second user equipment. In step S54, the server performs matching on the geographical location information according to map information, and determining map identifier location information. In step S55, the server sends the map identifier location information to the first user equipment. In step S56, the first user equipment positions the second user equipment according to the map identifier location information.

After acquiring the map identifier location information of the second user equipment according to the positioning authorization condition, the first user equipment may present positioning information of the second user equipment to the user.

In this embodiment of the present disclosure, optionally, positioning the second user equipment according to the map identifier location information includes displaying the map identifier location information of the second user equipment in a UI, or broadcasting the map identifier location information of the second user equipment using voice, or presenting the map identifier location information of the second user equipment using a short message service message.

It should be understood that, when presenting the location information of the second user equipment to the user on the electronic map, the first user equipment may also present the location information of the first user equipment.

Therefore, according to the positioning method in this embodiment of the present disclosure, a positioning user equipment positions a to-be-positioned user equipment according to a positioning authorization condition that is determined by the positioning user equipment and the to-be-positioned user equipment through negotiation such that privacy of the to-be-positioned user equipment can be effectively protected when the positioning user equipment positions another person, and user experience can be effectively improved.

Optionally, in this embodiment of the present disclosure, the first user equipment may further design a user operating interface.

For example, a "track" option is set at the bottom of a map display interface. After a user taps the "track" option, the first user equipment provides a selection interface, where selection information in the selection interface may be: "Specify a contact I want to position", "Positioning information for positioning another person", "White list", or "Blacklist". If the user selects "Specify a contact I want to position", a related application program of the first user equipment sends a positioning request message to the specified contact according to the identifier information of the first user equipment and selected "Positioning information for positioning another person". After an acknowledgment or rejection response of the opposite party is received, optionally, a user prompt message may be provided in the display interface. Furthermore, after obtaining a message indicating that the opposite party agrees to be positioned and tracked, the first user equipment receives real-time location-related information sent by the selected contact, sends the location-related information (which may also include location-related information of the first user equipment at the same time) to the backend server for matching, and displays map identifier location information of the selected contact to the user on the map after receiving data after matching of the backend server.

Optionally, the user may further create a positioning request specific to multiple persons by selecting "I want to create a to-be-tracked contact group". After the user creates the positioning group of multiple persons, a request message is sent to the multiple selected contacts according to set "Set a positioning authorization condition", and a member that joins the group is determined according to fed back response information.

Therefore, according to the positioning method in this embodiment of the present disclosure, a positioning user equipment positions a to-be-positioned user equipment according to a positioning authorization condition that is determined by the positioning user equipment and the to-be-positioned user equipment through negotiation such that privacy of the to-be-positioned user equipment can be effectively protected when the positioning user equipment positions another person, and user experience can be effectively improved.

Figure 9:
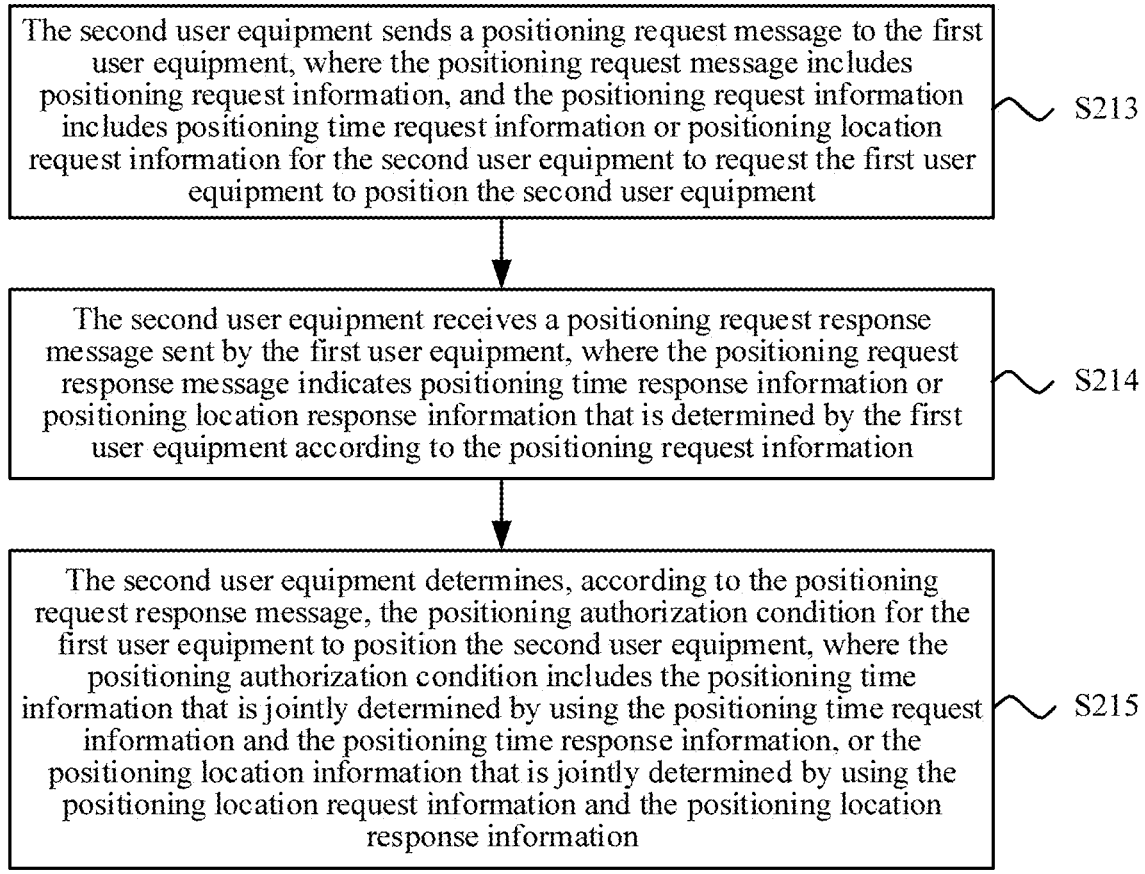
FIG. 9 is another schematic flowchart of determining a positioning authorization condition according to another embodiment of the present disclosure.

With reference to FIG. 3 to FIG. 6C, the foregoing describes in detail the positioning method according to this embodiment of the present disclosure from the perspective of the first user equipment that positions another person, with reference to FIG. 7, FIG. 8, and FIG. 9, the following describes a positioning method according to an embodiment of the present disclosure from the perspective of a second user equipment that is positioned by another person.

As shown in FIG. 7, a positioning method 200 according to this embodiment of the present disclosure, for example, may be performed by a second user equipment, and the positioning method 200 includes the following steps.

Step S210: A second user equipment determines a positioning authorization condition for a first user equipment to position the second user equipment, where the positioning authorization condition includes positioning time information or positioning location information that is jointly determined by the first user equipment and the second user equipment.

Step S220: The second user equipment sends location information of the second user equipment to the first user equipment according to the positioning authorization condition.

The second user equipment sends the location information of the second user equipment to the first user equipment according to the positioning authorization condition that is jointly determined by the first user equipment and the second user equipment. The positioning authorization condition includes the positioning time information or the positioning location information, where the positioning time information may be one or more time points, one or more time periods, or other time information, that is, the positioning time information indicates a positioning time range, and the positioning location information may be positioning start point location information, positioning termination point location information, or other location information, that is, the positioning location information indicates a positioning region range.

Therefore, according to the positioning method in this embodiment of the present disclosure, a positioning user equipment positions a to-be-positioned user equipment according to a positioning authorization condition that is determined by the positioning user equipment and the to-be-positioned user equipment through negotiation such that privacy of the to-be-positioned user equipment can be effectively protected when the positioning user equipment positions another person, and user experience can be effectively improved.

In step S210, the second user equipment negotiates with the first user equipment to determine the positioning authorization condition for allowing the first user equipment to position the second user equipment. There may be two methods for determining the positioning authorization condition. One is that the second user equipment receives a positioning request message for requesting to position the second user equipment that is initiated by the first user equipment, and the second user equipment negotiates with the first user equipment to determine the positioning authorization condition, and the other is that the second user equipment initiates, to the first user equipment, a positioning request for requesting the first user equipment to position the second user equipment, which are described in detail below with reference to FIG. 8 and FIG. 9.

As shown in FIG. 8, in this embodiment of the present disclosure, optionally, determining, by a second user equipment, a positioning authorization condition for a first user equipment to position the second user equipment includes the following steps.

Step S211: The second user equipment receives a positioning request message sent by the first user equipment, where the positioning request message includes positioning request information, and the positioning request information includes positioning time request information or positioning location request information for the first user equipment to request to position the second user equipment.

Step S212: The second user equipment determines, according to the positioning request message, the positioning authorization condition for the first user equipment to position the second user equipment, where the positioning authorization condition includes the positioning time information or the positioning location information that is jointly determined by the first user equipment and the second user equipment.

It should be understood that, the positioning request message includes the positioning request information in an implementation manner, and, in implementation, the positioning request message may directly include the positioning time request information or the positioning location request information for the second user equipment to request the first user equipment to position the second user equipment. Therefore, a structure of the positioning request information may not exist, and in this embodiment, the positioning request information may also be understood as the positioning request message.

Furthermore, as shown in FIG. 5, in step S21, the first user equipment sends a positioning request message to the second user equipment, where the positioning request message includes positioning request information, that is, the positioning request message is used to request to position the second user equipment according to the positioning request information, in step S22, the second user equipment determines, according to the received positioning request message, whether to agree to perform positioning, and a positioning authorization condition when positioning is agreed to be performed, in step S23, the second user equipment sends a positioning request response message to the first user equipment, where the positioning request response message indicates the positioning authorization condition, and in step S24, the first user equipment determines the positioning authorization condition according to the positioning request response message.

In step S21, the positioning request message sent by the first user equipment may further include identifier information of the first user equipment or the second user equipment, which, for example, may be a user name, a telephone number, or the like of the second user equipment or the first user equipment, or device type information or the like of the second user equipment or the first user equipment.

In step S22, the second user equipment determines, according to the received positioning request message, whether to agree to perform positioning, and the positioning authorization condition when positioning is agreed to be performed. Furthermore, the second user equipment may perform, using a locally preset positioning condition, matching on the positioning request information included in the positioning request message, to determine the positioning authorization condition, and present the positioning authorization condition to a user, and the user finally determines the positioning authorization condition. Alternatively, the second user equipment may directly feedback the positioning request information to a user, and determine the positioning authorization condition by completely relying on a user instruction. Alternatively, the second user equipment may locally preset a high-priority user identifier information list, for example, a white list, the second user equipment may automatically perform matching between identifier information of the first user equipment that actively initiates the positioning request and the high-priority user identifier information list, and when the high-priority user identifier information list includes the first user equipment, the second user equipment may return, without a user instruction, an acknowledgement message indicating that positioning and tracking are allowed. The following describes in detail a procedure and a method for determining, by the second user equipment, the positioning authorization condition according to the positioning request message.

In this embodiment of the present disclosure, optionally, determining, by the second user equipment according to the positioning request message, the positioning authorization condition for the first user equipment to position the second user equipment includes determining that the positioning request information included in the positioning request message is the positioning authorization condition, or determining that modified positioning request information is the positioning authorization condition.

The second user equipment may determine the positioning authorization condition according to the locally preset positioning condition, where the locally preset positioning condition may be some rough security policies, for example, simply, being positioned is allowed, being positioned is not allowed, being positioned is allowed in a time period, being positioned is allowed at a time point, or being positioned is allowed within a region range, or may be some indication information, for example, when the positioning request information meets a specific condition, being positioned is allowed within a specific time or region range. After being positioned is allowed, the positioning authorization condition may be directly determined according to the positioning request information or may be further set according to the locally preset positioning condition, and after the positioning request information is modified, it is determined that the modified positioning request information is the positioning authorization condition. It should be understood that, the locally preset positioning condition may be preconfigured by a system of the second user equipment or may be set at any time anywhere by a user, and specific content of the locally preset positioning condition is not limited in this embodiment of the present disclosure, as long as the positioning authorization condition can be determined using the locally preset positioning condition.

In this embodiment of the present disclosure, after determining the positioning authorization condition according to the locally preset positioning condition, the second user equipment further needs to present, to a user of the second user equipment, the positioning authorization condition or indication information indicating the positioning authorization condition, and finally determines, according to a user instruction, whether to allow the positioning request of the first user equipment, and a positioning authorization condition when positioning is allowed to be performed.

In this embodiment of the present disclosure, optionally, determining, by the second user equipment according to the positioning request information, the positioning authorization condition for the first user equipment to position the second user equipment includes presenting first request information to a user, where the first request information indicates positioning request information included in the positioning request message sent by the first user equipment, receiving a user instruction, where the user instruction indicates the positioning authorization condition that is determined by the user according to the positioning request information, and determining the positioning authorization condition according to the user instruction.

It should be understood that, a specific presenting manner may be voice broadcasting. For example, in a process in which a user drives a car or the like, or when a user uses a wearable device such as a SMART WATCH, the presenting manner may be directly displaying in a UI, or the user is notified using a short message service message, and a system program of the second user equipment may further determine, based on a local policy and acquired information, a manner for presenting to the user, which is not limited in this embodiment of the present disclosure.

It should be further understood that, in addition to presenting the determined positioning authorization condition to the user, the second user equipment may also present, to the user, a suggestion such as how to modify the positioning request information.

After receiving the user instruction, the second user equipment sends a positioning request response message to the first user equipment, where the positioning request response message includes the positioning authorization condition authorized by the user. If the user does not agree on the positioning request of the first user equipment, the positioning request response message may include indication information indicating that positioning is not agreed to be performed, or directly, any response message is not sent to the first user equipment.

In this embodiment of the present disclosure, optionally, the positioning request message sent by the first user equipment further includes identifier information of the first user equipment, and determining, by the second user equipment according to the positioning request message, the positioning authorization condition for the first user equipment to position the second user equipment includes determining that the positioning request information is the positioning authorization condition when locally preset identifier information includes the identifier information included in the positioning request message.

The locally preset identifier information may be a contact list locally stored in the second user equipment, a credible positioning contact list preset in the second user equipment, a user equipment type, or any preset information that limits a positioning user equipment or a positioning user. Further, for example, the locally preset identifier information is a credible positioning contact list locally stored in the second user equipment, and when the user name of the first user equipment that initiates the positioning request is in the credible positioning contact list, the positioning request of the first user equipment is allowed, and the positioning request information may be directly used as the positioning authorization condition.

In this embodiment of the present disclosure, after determining the positioning authorization condition according to the locally preset identifier information, the second user equipment also needs to present, to the user of the second user equipment, the positioning authorization condition or the indication information indicating the positioning authorization condition, and finally determines, according to the user instruction, whether to allow the positioning request of the first user equipment, and the positioning authorization condition when positioning is allowed to be performed.

The locally preset identifier information of the second user equipment may also be high-priority positioning user identifier information, for example, a "positioning white list", and when a user of the first user equipment that initiates the positioning request is in the "positioning white list", the positioning request information may be directly used as the positioning authorization condition, and a positioning request response message may be directly sent to the first user equipment, where the positioning request response message indicates the positioning authorization condition. In this embodiment of the present disclosure, the second user equipment may not rely on a user instruction but directly feedback a positioning request response message to the first user equipment. The second user equipment may further locally set low-level user identifier information, for example, a "positioning blacklist", and directly reject the positioning request of the first user equipment when determining that the identifier information of the first user equipment is in the "positioning blacklist".

In addition to first determining the positioning authorization condition according to the locally preset positioning condition or the locally preset identifier information, and then, presenting the positioning authorization condition to the user, and determining, according to the user instruction, the positioning authorization condition authorized by the user, the second user equipment may also completely rely on a UI input feedback of the user.

In this embodiment of the present disclosure, optionally, the positioning method further includes presenting second request information to a user, where the second request information indicates the positioning authorization condition, receiving a user instruction, where the user instruction indicates a positioning authorization condition authorized by the user, and sending a positioning request response message to the first user equipment, where the positioning request response message includes the positioning authorization condition authorized by the user.

In step S210, the second user equipment negotiates with the first user equipment to determine the positioning authorization condition, and a method for determining the positioning authorization condition may also be that the second user equipment initiates, to the first user equipment, a positioning request message for requesting to position the second user equipment, and the second user equipment negotiates with the first user equipment to determine the positioning authorization condition.

As shown in FIG. 9, in this embodiment of the present disclosure, optionally, determining, by a second user equipment, a positioning authorization condition for a first user equipment to position the second user equipment includes the following steps.

Step S213: The second user equipment sends a positioning request message to the first user equipment, where the positioning request message includes positioning request information, and the positioning request information includes positioning time request information or positioning location request information for the second user equipment to request the first user equipment to position the second user equipment.

Step S214: The second user equipment receives a positioning request response message sent by the first user equipment, where the positioning request response message indicates positioning time response information or positioning location response information that is determined by the first user equipment according to the positioning request message.

Step S215: The second user equipment determines, according to the positioning request response message, the positioning authorization condition for the first user equipment to position the second user equipment, where the positioning authorization condition includes the positioning time information that is jointly determined by using the positioning time request information and the positioning time response information, or the positioning location information that is jointly determined by using the positioning location request information and the positioning location response information.

It should be understood that, that the positioning request message includes the positioning request information is an implementation manner, and, in implementation, the positioning request message may directly include the positioning time request information or the positioning location request information for the second user equipment to request the first user equipment to position the second user equipment. Therefore, a structure of the positioning request information may not exist, and in this embodiment, the positioning request information may also be understood as the positioning request message.

Furthermore, as shown in FIG. 4, a specific procedure is consistent with that in the positioning method according to the embodiment of the present disclosure that is described from the perspective of the first user equipment, which is not described herein again.

With reference to FIG. 4, FIG. 5, FIG. 8, and FIG. 9, the foregoing describes in detail a procedure and a method for negotiating, by the first user equipment with the second user equipment to determine the positioning authorization condition. Formats of the positioning request message and the positioning request response message exchanged between the first user equipment and the second user equipment may be short message service message, or data packet.

Therefore, according to the positioning method in this embodiment of the present disclosure, a positioning user equipment positions a to-be-positioned user equipment according to a positioning authorization condition that is determined by the positioning user equipment and the to-be-positioned user equipment through negotiation such that privacy of the to-be-positioned user equipment can be effectively protected when the positioning user equipment positions another person, and user experience can be effectively improved.

In step S220, the second user equipment sends the location information to the first user equipment according to the positioning authorization condition such that the first user equipment positions the second user equipment. The second user equipment may directly send geographical location information of the second user equipment to the first user equipment or may send map identifier location information on which matching is performed with map information. The following describes that the first user equipment acquires the location information of the second user equipment.

In this embodiment of the present disclosure, optionally, sending, by the second user equipment, location information of the second user equipment to the first user equipment according to the positioning authorization condition includes sending the geographical location information to the first user equipment such that the first user equipment positions the second user equipment.

Further, as shown in FIG. 6A, in step S31, the second user equipment sends geographical location information to the first user equipment, and in step S32, the first user equipment positions the second user equipment according to the geographical location information.

In step S31, the second user equipment sends the geographical location information to the first user equipment, where the second user equipment determines real-time location information of the second user equipment according to a positioning function module, for example, the geographical location information (a longitude, a latitude, and a height). Common positioning methods include a positioning method based on a GPS, a positioning method based on a base station, and a positioning method based on a WLAN.

The first type is a positioning technology dominated by a mobile station. For example, a GPS positioning module is integrated in the mobile station, and a location signal of the mobile station is sent to a positioning background to implement accurate positioning on a user. For such a technology, new hardware needs to be added to the mobile station, which brings adverse impact to a size and costs of the mobile station. From only the perspective of the technology, such a technology is easier to provide relatively accurate user positioning information.

The second type is a positioning technology dominated by a base station, and for such a solution, some improvements need to be performed on an existing base station and an existing switching center, but the positioning technology is compatible with an existing terminal device. A specific implementation technology that can be selected by the positioning technology mainly includes a positioning technology for measuring a direction of a signal (an angle of arrival of the signal (AOA)), a positioning technology for measuring power of a signal, and a positioning technology for measuring a propagation time feature of a signal (a time of arrival (TOA), and a time difference of arrival (TDOA)). For positioning of the base station, a mobile phone does not need to have a GPS positioning capability, but accuracy is dependent on distribution and a size of coverage of the base station to a great extent, and an error exceeds one kilometer in some cases.

The third type is a manner of performing positioning within a small range using WIFI. In an actual application, to improve positioning accuracy, a combination of the foregoing several technologies may also be used.

In this embodiment of the present disclosure, optionally, sending, by the second user equipment, location information of the second user equipment to the first user equipment according to the positioning authorization condition includes determining, by the second user equipment, map identifier location information of the second user equipment according to geographical location information of the second user equipment, and sending the map identifier location information to the first user equipment according to the positioning authorization condition such that the first user equipment positions the second user equipment.

Further, as shown in FIG. 6B, in step S41, the second user equipment sends map identifier location information of the second user equipment to the first user equipment, and in step S42, the first user equipment positions the second user equipment according to the map identifier location information.

In step S41, the second user equipment sends the map identifier location information of the second user equipment to the first user equipment, and further, the second user equipment may request a server or may determine, according to local map information, map identifier location information corresponding to geographical location information.

In this embodiment of the present disclosure, optionally, determining, by the second user equipment, map identifier location information of the second user equipment according to geographical location information of the second user equipment includes sending, by the second user equipment, a request message including the geographical location information to a server, where the request message is used to request the server to send map identifier location information obtained after matching is performed between the geographical location information and map information of the server, and receiving a request response message sent by the server, where the request response message includes the map identifier location information, and determining the map identifier location information according to the request response message.

In this embodiment of the present disclosure, optionally, determining, by the second user equipment, map identifier location information of the second user equipment according to geographical location information of the second user equipment includes performing matching on the geographical location information according to local map information, and determining the map identifier location information of the second user equipment.

It should be understood that, the second user equipment may also send location-related information of the second user equipment to the first user equipment after receiving a location information request message sent by the first user equipment.

In this embodiment of the present disclosure, optionally, the positioning method further includes receiving a location information request message sent by the first user equipment.

In this embodiment of the present disclosure, optionally, sending, by the second user equipment, location information of the second user equipment to the first user equipment according to the positioning authorization condition includes receiving, by the second user equipment, a location request message sent by a server, where the message includes identifier information of the second user equipment, and sending, by the second user equipment, a location request response message including geographical location information of the second user equipment to the server such that the server sends, to the first user equipment, map identifier location information obtained after matching is performed between the geographical location information and map information of the server such that the first user equipment positions the second user equipment.

Furthermore, as shown in FIG. 6C, in step S51, the first user equipment sends a request message including identifier information of the second user equipment to a server. In step S52, the server sends a location request message including the identifier information of the second user equipment to the second user equipment. In step S53, the second user equipment sends a location request response message to the server, where the location request response message includes geographical location information of the second user equipment. In step S54, the server performs matching on the geographical location information according to map information, and determining map identifier location information. In step S55, the server sends the map identifier location information to the first user equipment, and in step S56, the first user equipment positions the second user equipment according to the map identifier location information.

Therefore, according to the positioning method in this embodiment of the present disclosure, a positioning user equipment positions a to-be-positioned user equipment according to a positioning authorization condition that is determined by the positioning user equipment and the to-be-positioned user equipment through negotiation such that privacy of the to-be-positioned user equipment can be effectively protected when the positioning user equipment positions another person, and user experience can be effectively improved.

It should be understood that sequence numbers of the foregoing processes do not mean execution sequences in various embodiments of the present disclosure. The execution sequences of the processes should be determined according to functions and internal logic of the processes, and should not be construed as any limitation to the implementation processes of the embodiments of the present disclosure.

It should be further understood that, in the embodiments of the present disclosure, only an example in which the first user equipment serves as a positioning user equipment, and the user equipment serves as a to-be-positioned user equipment is used for description, but this embodiment of the present disclosure is not limited thereto, and any user equipment may serve as a positioning user equipment, or may serve as a to-be-positioned user equipment.

With reference to FIG. 1 to FIG. 9, the foregoing describes in detail the positioning method according to the embodiments of the present disclosure, and with reference to FIG. 10 to FIG. 13, the following describes in detail a user equipment according to an embodiment of the present disclosure.

Figure 10:
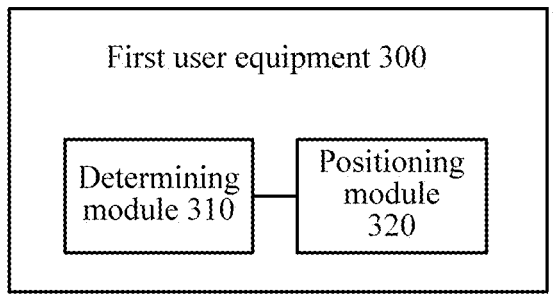
FIG. 10 is a schematic block diagram of a first user equipment according to an embodiment of the present disclosure.

FIG. 10 is a schematic block diagram of a first user equipment 300 according to an embodiment of the present disclosure. As shown in FIG. 10, the first user equipment 300 includes a determining module 310 configured to determine a positioning authorization condition for positioning a second user equipment, where the positioning authorization condition includes positioning time information or positioning location information that is jointly determined by the first user equipment 300 and the second user equipment, and a positioning module 320 configured to position the second user equipment under the positioning authorization condition determined by the determining module 310, and obtain location information of the second user equipment.

Therefore, according to the first user equipment 300 in this embodiment of the present disclosure, the first user equipment 300 positions a to-be-positioned user equipment according to a positioning authorization condition that is determined by the first user equipment 300 and the to-be-positioned user equipment through negotiation such that privacy of the to-be-positioned user equipment can be effectively protected when the first user equipment 300 positions another person, and user experience can be effectively improved.

Figure 11:
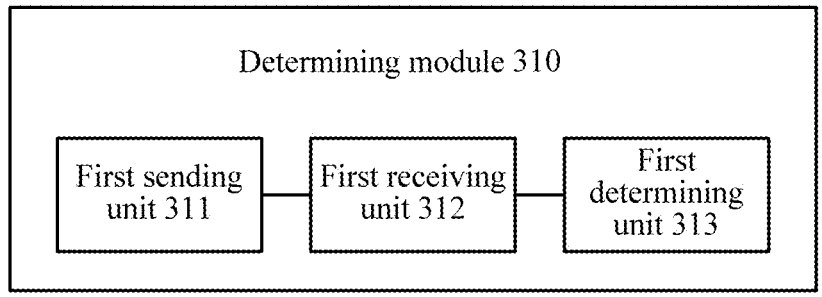
FIG. 11 is another schematic block diagram of a determining module of a first user equipment according to an embodiment of the present disclosure.

As shown in FIG. 11, in this embodiment of the present disclosure, optionally, the determining module 310 includes a first sending unit 311 configured to send a positioning request message to the second user equipment, where the positioning request message includes positioning request information, and the positioning request information includes positioning time request information or positioning location request information for the first user equipment to request to position the second user equipment, a first receiving unit 312 configured to receive a positioning request response message sent by the second user equipment, where the positioning request response message indicates positioning time response information or positioning location response information that is determined by the second user equipment according to the positioning request message, and a first determining unit 313 configured to determine, according to the positioning request response message received by the first receiving unit 312, the positioning authorization condition for the first user equipment to position the second user equipment.

It should be understood that, that the positioning request message includes the positioning request information in an implementation manner, and, in implementation, the positioning request message may directly include the positioning time request information or the positioning location request information for the second user equipment to request the first user equipment to position the second user equipment. Therefore, a structure of the positioning request information may not exist, and in this embodiment, the positioning request information may also be understood as the positioning request message.

Figure 12:
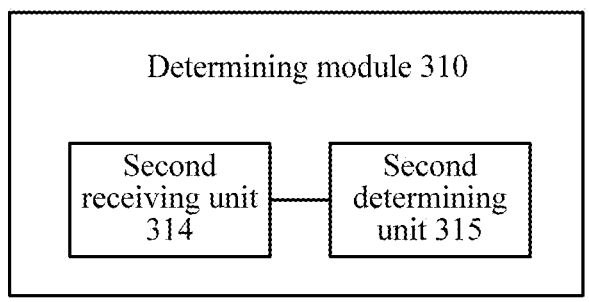
FIG. 12 is still another schematic block diagram of a determining module of a first user equipment according to an embodiment of the present disclosure.

As shown in FIG. 12, in this embodiment of the present disclosure, optionally, the determining module 310 further includes a second receiving unit 314 configured to receive a positioning request message sent by the second user equipment, where the positioning request message includes positioning request information, and the positioning request information includes positioning time request information or positioning location request information for the second user equipment to request the first user equipment to position the second user equipment, and a second determining unit 315 configured to determine, according to the positioning request message received by the second receiving unit 314, the positioning authorization condition for the first user equipment to position the second user equipment.

It should be understood that, that the positioning request message includes the positioning request information in an implementation manner, and, in implementation, the positioning request message may directly include the positioning time request information or the positioning location request information for the second user equipment to request the first user equipment to position the second user equipment. Therefore, a structure of the positioning request information may not exist, and in this embodiment, the positioning request information may also be understood as the positioning request message.

In this embodiment of the present disclosure, optionally, the second determining unit 315 is further configured to determine that the positioning request information included in the positioning request message is the positioning authorization condition, or determine that modified positioning request information is the positioning authorization condition, where a positioning range indicated by the positioning authorization condition does not exceed a positioning range indicated by the positioning request information.

In this embodiment of the present disclosure, optionally, the second determining unit 315 is further configured to determine that the positioning request information is the positioning authorization condition when determining that locally preset identifier information includes identifier information of the second user equipment that is included in the positioning request message received by the second receiving unit 314.

In this embodiment of the present disclosure, optionally, the second determining unit 315 further includes a presenting subunit (not shown) configured to present first request information to a user, where the first request information indicates positioning request information included in the positioning request message, a receiving subunit (not shown) configured to receive a user instruction, where the user instruction indicates the positioning authorization condition that is determined by the user according to the positioning request information, and a determining subunit (not shown) configured to determine the positioning authorization condition according to the user instruction received by the receiving subunit.

In this embodiment of the present disclosure, optionally, the first user equipment 300 further includes a presenting module (not shown) configured to present second request information to a user, where the second request information indicates the positioning authorization condition determined by the second determining unit 315, a receiving module (not shown) configured to receive a user instruction, where the user instruction indicates a positioning authorization condition authorized by the user, and a first sending module (not shown) configured to send a positioning request response message to the second user equipment, where the positioning request response message includes the positioning authorization condition authorized by the user and received by the receiving module.

In this embodiment of the present disclosure, optionally, the first user equipment 300 further includes a second sending module (not shown) configured to send a positioning request response message to the second user equipment, where the positioning request response message includes the positioning authorization condition determined by the second determining unit.

In this embodiment of the present disclosure, optionally, the positioning module 320 includes a third receiving unit (not shown) configured to receive geographical location information of the second user equipment that is sent by the second user equipment according to the positioning authorization condition.

In this embodiment of the present disclosure, optionally, the positioning module 320 further includes a third sending unit (not shown) configured to send a location information request message to the second user equipment, where the third receiving unit is further configured to receive the geographical location information of the second user equipment that is sent by the second user equipment based on the location information request message under the positioning authorization condition.

In this embodiment of the present disclosure, optionally, the positioning module 320 further includes a fourth sending unit (not shown) configured to send a request message including the geographical location information to a server, where the request message is used to request the server to send map identifier location information obtained after matching is performed between the geographical location information and map information of the server, where the third receiving unit is further configured to receive a request response message sent by the server, where the request response message includes the map identifier location information after the matching is performed between the geographical location information and the map information of the server, and a third determining unit (not shown) configured to determine map identifier location information of the second user equipment according to the request response message received by the third receiving unit.

In this embodiment of the present disclosure, optionally, the positioning module 320 further includes a fourth determining unit (not shown) configured to perform matching on the geographical location information according to local map information, and determine map identifier location information of the second user equipment.

In this embodiment of the present disclosure, optionally, the positioning module 320 further includes a fifth sending unit (not shown) configured to send a request message including the identifier information of the second user equipment to a server, where the request message is used to request the location information of the second user equipment, a fourth receiving unit (not shown) configured to receive a request response message sent by the server, where the request response message includes map identifier location information obtained after matching is performed between geographical location information of the second user equipment and map information of the server, and a fifth determining unit (not shown) configured to determine map identifier location information of the second user equipment according to the request response message received by the fourth receiving unit.

In this embodiment of the present disclosure, optionally, the positioning module 320 further includes a fifth receiving unit (not shown) configured to receive map identifier location information of the second user equipment that is sent by the second user equipment under the positioning authorization condition, where the map identifier location information is information obtained after matching is performed between geographical location information of the second user equipment and map information.

In this embodiment of the present disclosure, optionally, the first user equipment 300 further includes a display module (not shown) configured to display the map identifier location information of the second user equipment in a UI, or a broadcasting module (not shown) configured to broadcast the map identifier location information of the second user equipment using voice, or a presenting module (not shown) configured to present the map identifier location information of the second user equipment using a short message service message.

It should be understood that, the first user equipment 300 according to this embodiment of the present disclosure may correspond to the first user equipment in the positioning method in the embodiments of the present disclosure, and the foregoing and other operations or functions of the modules in the first user equipment 300 are intended for implementing corresponding procedures in the methods in FIG. 3 to FIG. 9, which are not described herein again for brevity.

Therefore, according to the first user equipment 300 in this embodiment of the present disclosure, the first user equipment 300 positions a to-be-positioned user equipment according to a positioning authorization condition that is determined by the first user equipment 300 and the to-be-positioned user equipment through negotiation such that privacy of the to-be-positioned user equipment can be effectively protected when the first user equipment 300 positions another person, and user experience can be effectively improved.

Figure 13:
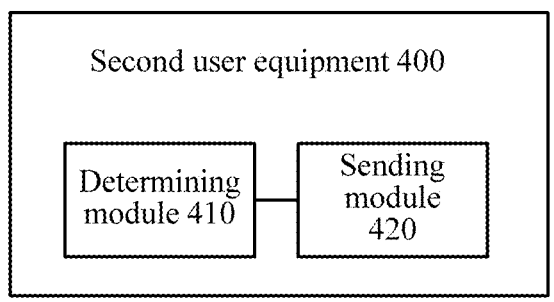
FIG. 13 is a schematic block diagram of a second user equipment according to an embodiment of the present disclosure.

With reference to FIG. 10 to FIG. 12, the foregoing describes in detail the first user equipment 300 according to this embodiment of the present disclosure, and with reference to FIG. 13, the following describes in detail second user equipment 400 according to an embodiment of the present disclosure.

FIG. 13 is a schematic block diagram of a second user equipment 400 according to an embodiment of the present disclosure. As shown in FIG. 13, the second user equipment 400 includes a determining module 410 configured to determine a positioning authorization condition for a first user equipment to position the second user equipment, where the positioning authorization condition includes positioning time information or positioning location information that is jointly determined by the first user equipment and the second user equipment, and a sending module 420 configured to send location information of the second user equipment to the first user equipment according to the positioning authorization condition determined by the determining module 410.

Therefore, according to the second user equipment 400 in this embodiment of the present disclosure, the second user equipment 400 sends, according to a positioning authorization condition that is determined by a positioning user equipment and the second user equipment 400 through negotiation, location information of the second user equipment 400 to the positioning user equipment under the positioning authorization condition such that the positioning user equipment positions the second user equipment 400 such that privacy of the second user equipment 400 can be effectively protected when the positioning user equipment positions another person, and user experience can be effectively improved.

In this embodiment of the present disclosure, optionally, the determining module 410 includes a first sending unit (not shown) configured to send a positioning request message to the first user equipment, where the positioning request message includes positioning request information, and the positioning request information includes positioning time request information or positioning location request information for the second user equipment 400 to request the first user equipment to position the second user equipment 400, a first receiving unit (not shown) configured to receive a positioning request response message sent by the first user equipment, where the positioning request response message indicates positioning time response information or positioning location response information that is determined by the first user equipment according to the positioning request information, and a first determining unit (not shown) configured to determine, according to the positioning request response message received by the first receiving unit, the positioning authorization condition for the first user equipment to position the second user equipment 400, where the positioning authorization condition includes the positioning time information that is jointly determined using the positioning time request information and the positioning time response information, or the positioning location information that is jointly determined using the positioning location request information and the positioning location response information.

It should be understood that, that the positioning request message includes the positioning request information is an implementation manner, and, in implementation, the positioning request message may directly include the positioning time request information or the positioning location request information for the second user equipment 400 to request the first user equipment to position the second user equipment 400. Therefore, a structure of the positioning request information may not exist, and in this embodiment, the positioning request information may also be understood as the positioning request message.

In this embodiment of the present disclosure, optionally, the determining module 410 further includes a second receiving unit (not shown) configured to receive a positioning request message sent by the first user equipment, where the positioning request message includes positioning request information, and the positioning request information includes positioning time request information or positioning location request information for the first user equipment to request to position the second user equipment 400, and a second determining unit (not shown) configured to determine, according to the positioning request message received by the second receiving unit, the positioning authorization condition for the first user equipment to position the second user equipment 400, where the positioning authorization condition includes the positioning time information or the positioning location information that is jointly determined by the first user equipment and the second user equipment 400.

It should be understood that, that the positioning request message includes the positioning request information in an implementation manner, and, in implementation, the positioning request message may directly include the positioning time request information or the positioning location request information for the second user equipment 400 to request the first user equipment to position the second user equipment 400. Therefore, a structure of the positioning request information may not exist, and in this embodiment, the positioning request information may also be understood as the positioning request message.

In this embodiment of the present disclosure, optionally, the second determining unit (not shown) is further configured to determine that the positioning request information included in the positioning request message is the positioning authorization condition, or determine that modified positioning request information is the positioning authorization condition.

In this embodiment of the present disclosure, optionally, the second determining unit is further configured to determine that the positioning request information is the positioning authorization condition when determining that locally preset identifier information includes identifier information of the first user equipment that is included in the positioning request message received by the second receiving unit.

In this embodiment of the present disclosure, optionally, the second determining unit further includes a presenting subunit (not shown) configured to present first request information to a user, where the first request information indicates positioning request information included in the positioning request message sent by the first user equipment, a receiving subunit (not shown) configured to receive a user instruction, where the user instruction indicates the positioning authorization condition that is determined by the user according to the positioning request information, and a determining subunit (not shown) configured to determine the positioning authorization condition according to the user instruction received by the receiving subunit.

In this embodiment of the present disclosure, optionally, the second user equipment 400 further includes a presenting module (not shown) configured to present second request information to a user, where the second request information indicates the positioning authorization condition, a receiving module (not shown) configured to receive a user instruction, where the user instruction indicates a positioning authorization condition authorized by the user, where the sending module 420 is further configured to send a positioning request response message to the first user equipment, where the positioning request response message includes the positioning authorization condition authorized by the user and received by the receiving module.

In this embodiment of the present disclosure, optionally, the sending module 420 is further configured to send a positioning request response message to the first user equipment, where the positioning request response message includes the positioning authorization condition determined by the second determining unit.

In this embodiment of the present disclosure, optionally, the sending module 420 is further configured to send the geographical location information to the first user equipment such that the first user equipment positions the second user equipment 400.

In this embodiment of the present disclosure, optionally, the sending module 420 includes a third determining unit (not shown) configured to determine map identifier location information of the user equipment according to geographical location information of the user equipment, and a second sending unit (not shown) configured to send the map identifier location information determined by the third determining unit to the first user equipment such that the first user equipment positions the second user equipment 400.

In this embodiment of the present disclosure, optionally, the sending module 420 further includes a third receiving unit (not shown) configured to receive a location information request message sent by the first user equipment.

In this embodiment of the present disclosure, optionally, the third determining unit includes a first sending subunit (not shown) configured to send a request message including the geographical location information to a server, where the request message is used to request the server to send map identifier location information obtained after matching is performed between the geographical location information and map information of the server, a third receiving subunit (not shown) configured to receive a request response message sent by the server, where the request response message includes the map identifier location information, and a second determining subunit (not shown) configured to determine the map identifier location information according to the request response message received by the second receiving subunit.

In this embodiment of the present disclosure, optionally, the third determining unit is further configured to perform matching on the geographical location information according to local map information, and determine the map identifier location information of the user equipment.

In this embodiment of the present disclosure, optionally, the sending module 420 further includes a fourth receiving unit (not shown) configured to receive a location request message sent by a server, where the message includes the identifier information of the second user equipment 400, and a third sending unit (not shown) configured to send a location request response message including geographical location information of the second user equipment 400 to the server such that the server sends, to the first user equipment, map identifier location information obtained after matching is performed between the geographical location information and map information of the server such that the first user equipment positions the second user equipment 400.

It should be understood that, the second user equipment 400 according to this embodiment of the present disclosure may correspond to the positioning method in the embodiments of the present disclosure, and the foregoing and other operations or functions of the modules in the second user equipment 400 are intended for implementing corresponding procedures in the methods in FIG. 3 to FIG. 9, which are not described herein again for brevity.

Therefore, according to the second user equipment 400 in this embodiment of the present disclosure, the second user equipment 400 sends, according to a positioning authorization condition that is determined by a positioning user equipment and the second user equipment 400 through negotiation, location information of the second user equipment 400 to the positioning user equipment under the positioning authorization condition such that the positioning user equipment positions the second user equipment 400 such that privacy of the second user equipment 400 can be effectively protected when the positioning user equipment positions another person, and user experience can be effectively improved.

Figure 14:
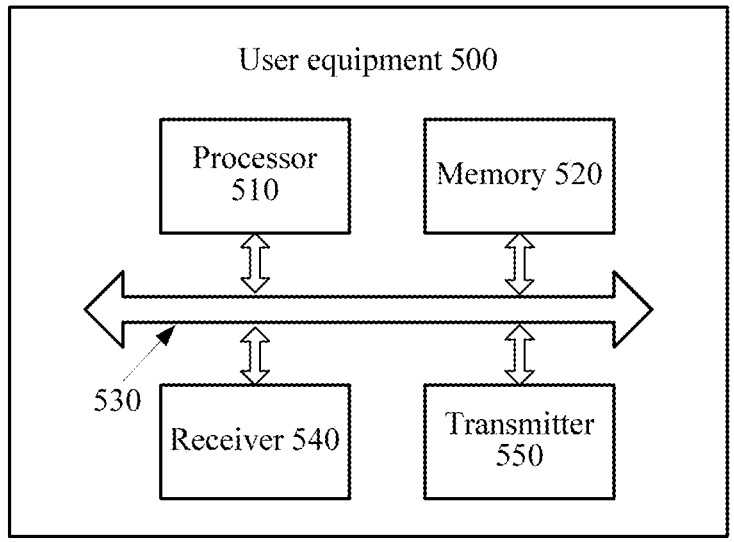
FIG. 14 is a schematic block diagram of a user equipment according to another embodiment of the present disclosure.

As shown in FIG. 14, an embodiment of the present disclosure further provides a user equipment 500. The user equipment 500 includes a processor 510, a memory 520, a bus system 530, a receiver 540, and a transmitter 550. The processor 510, the memory 520, the receiver 540, and the transmitter 550 are connected using the bus system 530, the memory 520 is configured to store an instruction, and the processor 510 is configured to execute the instruction stored in the memory 520, to control the receiver 540 to receive a signal, and control the transmitter 550 to send a signal. The processor 510 is configured to determine a positioning authorization condition for positioning a second user equipment, where the positioning authorization condition includes positioning time information or positioning location information that is jointly determined by the user equipment and the second user equipment, and the processor 510 is further configured to position the second user equipment under the positioning authorization condition, and obtain location information of the second user equipment.

Therefore, the user equipment 500 in this embodiment of the present disclosure positions a to-be-positioned user equipment using a positioning authorization condition that is determined by the user equipment 500 and the to-be-positioned user equipment through negotiation such that privacy of the to-be-positioned user equipment can be effectively protected when another person is positioned, and user experience can be effectively improved.

It should be understood that, in this embodiment of the present disclosure, the processor 510 may be a central processing unit (CPU), or the processor 510 may be another general processor, a digital signal processor (DSP), an application specific integrated circuit (ASIC), a field programmable gate array (FPGA) or another programmable logic device, a discrete gate, a transistor logic device or a discrete hardware component, or the like. The general processor may be a microprocessor, or the processor may be any conventional processor.

The memory 520 may include a read-only memory (ROM) and a random access memory (RAM), and provide an instruction and data to the processor 510. A part of the memory 520 may further include a non-volatile RAM. For example, the memory 520 may further store information about a device type.

The bus system 530 includes not only a data bus, but also a power supply bus, a control bus, a state signal bus, and the like. However, for clear description, various types of buses in the figure are marked as the bus system 530.

In an implementation process, the steps of the foregoing methods can be completed using an integrated logical circuit of hardware or an instruction in a software form in the processor 510. Steps of the methods disclosed with reference to the embodiments of the present disclosure may be directly performed and completed by means of a hardware processor, or may be performed and completed using a combination of hardware and software modules in the processor. The software module may be located in a mature storage medium in the art, such as a RAM, a flash memory, a ROM, a programmable ROM, an electrically-erasable programmable memory, or a register. The storage medium is located in the memory 520, and the processor 510 reads information in the memory 520 and completes the steps in the foregoing methods in combination with hardware of the processor. To avoid repetition, details are not described herein again.

Optionally, as an embodiment, the transmitter 550 is configured to send a positioning request message to the second user equipment, where the positioning request message includes positioning request information, and the positioning request information includes positioning time request information or positioning location request information for the first user equipment to request to position the second user equipment. The receiver 540 is configured to receive a positioning request response message sent by the second user equipment, where the positioning request response message indicates positioning time response information or positioning location response information that is determined by the second user equipment based on the positioning request information, and the processor 510 is configured to determine, according to the positioning request response message received by the receiver 540, the positioning authorization condition for the first user equipment to position the second user equipment, where the positioning authorization condition includes the positioning time information that is jointly determined using the positioning time request information and the positioning time response information, or the positioning location information that is jointly determined using the positioning location request information and the positioning location response information.

It should be understood that, that the positioning request message includes the positioning request information in an implementation manner, and, in implementation, the positioning request message may directly include the positioning time request information or the positioning location request information for the second user equipment to request the first user equipment to position the second user equipment. Therefore, a structure of the positioning request information may not exist, and in this embodiment, the positioning request information may also be understood as the positioning request message.

Optionally, as an embodiment, the receiver 540 is configured to receive a positioning request message sent by the second user equipment, where the positioning request message includes positioning request information, and the positioning request information includes positioning time request information or positioning location request information for the second user equipment to request the first user equipment to position the second user equipment, and the processor 510 is configured to determine, according to the positioning request message, the positioning authorization condition for the user equipment to position the second user equipment, where the positioning authorization condition includes the positioning time information or the positioning location information that is jointly determined by the first user equipment and the second user equipment.

It should be understood that, that the positioning request message includes the positioning request information in an implementation manner, and, in implementation, the positioning request message may directly include the positioning time request information or the positioning location request information for the second user equipment to request the first user equipment to position the second user equipment. Therefore, a structure of the positioning request information may not exist, and in this embodiment, the positioning request information may also be understood as the positioning request message.

Optionally, as an embodiment, the processor 510 is further configured to determine that the positioning request information included in the positioning request message is the positioning authorization condition, or determine that modified positioning request information is the positioning authorization condition, where a positioning range indicated by the positioning authorization condition does not exceed a positioning range indicated by the positioning request information.

Optionally, as an embodiment, the processor 510 is further configured to determine that the positioning request information is the positioning authorization condition when determining that locally preset identifier information includes identifier information of the second user equipment that is included in the positioning request message.

Optionally, as an embodiment, the transmitter 550 is further configured to present first request information to a user, where the first request information indicates positioning request information included in the positioning request message. The receiver 540 is further configured to receive a user instruction, where the user instruction indicates the positioning authorization condition that is determined by the user according to the positioning request information, and the processor 510 is further configured to determine the positioning authorization condition according to the user instruction.

Optionally, as an embodiment, the transmitter 550 is further configured to present second request information to a user, where the second request information indicates the positioning authorization condition. The receiver 540 is further configured to receive a user instruction, where the user instruction indicates a positioning authorization condition authorized by the user, and the transmitter 550 is further configured to send a positioning request response message to the second user equipment, where the positioning request response message includes the positioning authorization condition authorized by the user and received by the receiver 540.

Optionally, as an embodiment, the transmitter 550 is further configured to send a positioning request response message to the second user equipment, where the positioning request response message includes the positioning authorization condition determined by the processor 510.

Optionally, as an embodiment, the receiver 540 is further configured to receive geographical location information of the second user equipment that is sent by the second user equipment under the positioning authorization condition, and the processor 510 is further configured to position the second user equipment according to the geographical location information received by the receiver 540.

Optionally, as an embodiment, the transmitter 550 is further configured to send a location information request message to the second user equipment, and the receiver 540 is further configured to receive the geographical location information of the second user equipment that is sent by the second user equipment based on the location information request message under the positioning authorization condition.

Optionally, as an embodiment, the transmitter 550 further sends a request message including the geographical location information to a server, where the request message is used to request the server to send map identifier location information obtained after matching is performed between the geographical location information and map information of the server. The receiver 540 is further configured to receive a request response message sent by the server, where the request response message includes the map identifier location information after the matching is performed between the geographical location information and the map information of the server, and the processor 510 is further configured to position the second user equipment according to the map identifier location information received by the receiver 540.

Optionally, as an embodiment, the processor 510 is further configured to perform matching on the geographical location information according to local map information, and determine the map identifier location information, and position the second user equipment according to the map identifier location information determined by the processor 510.

Optionally, as an embodiment, the transmitter 550 is further configured to send a request message including the identifier information of the second user equipment to a server, where the request message is used to request the location information of the second user equipment. The receiver 540 is further configured to receive a request response message sent by the server, where the request response message includes map identifier location information obtained after matching is performed between geographical location information of the second user equipment and map information of the server, and the processor 510 is further configured to position the second user equipment according to the map identifier location information received by the receiver 540.

Optionally, as an embodiment, the processor 510 is further configured to display the map identifier location information of the second user equipment in a UI, or configured to broadcast the map identifier location information of the second user equipment using voice, or configured to present the map identifier location information of the second user equipment using a short message service message.

It should be understood that, the user equipment 500 according to this embodiment of the present disclosure may correspond to the first user equipment in the positioning method in the embodiments of the present disclosure or may correspond to the first user equipment 300 according to the embodiments of the present disclosure, and the foregoing and other operations or functions of the modules in the user equipment 500 are intended for implementing corresponding procedures in the methods in FIG. 3 to FIG. 9, which are not described herein again for brevity.

Therefore, the user equipment 500 in this embodiment of the present disclosure positions a to-be-positioned user equipment using a positioning authorization condition that is determined by the user equipment 500 and the to-be-positioned user equipment through negotiation such that privacy of the to-be-positioned user equipment can be effectively protected when another person is positioned, and user experience can be effectively improved.

Figure 15:
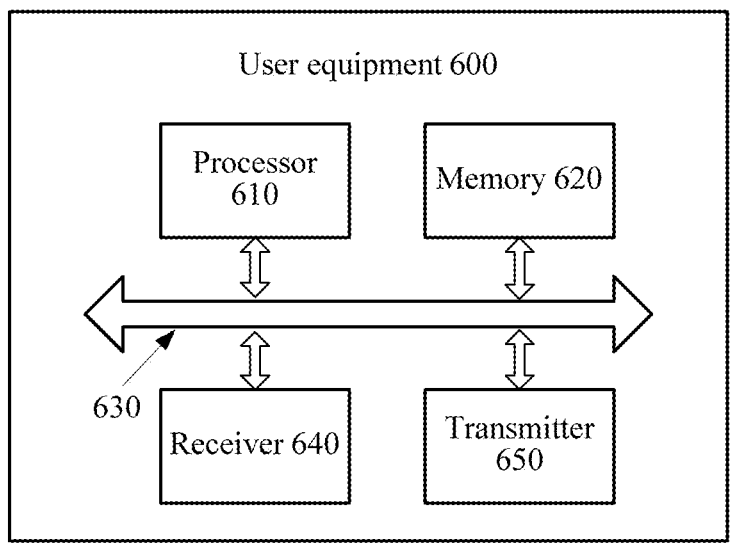
FIG. 15 is a schematic block diagram of a user equipment according to another embodiment of the present disclosure.

As shown in FIG. 15, an embodiment of the present disclosure further provides a user equipment 600. The user equipment 600 includes a processor 610, a memory 620, a bus system 630, a receiver 640, and a transmitter 650. The processor 610, the memory 620, the receiver 640, and the transmitter 650 are connected using the bus system 630, the memory 620 is configured to store an instruction, and the processor 610 is configured to execute the instruction stored in the memory 620, to control the receiver 640 to receive a signal, and control the transmitter 650 to send a signal. The processor 610 is configured to determine a positioning authorization condition for a first user equipment to position the user equipment, where the positioning authorization condition includes positioning time information or positioning location information that is jointly determined by the first user equipment and the user equipment, and the transmitter 650 is configured to send location information of the user equipment to the first user equipment according to the positioning authorization condition determined by the processor 610.

Therefore, the user equipment 600 in this embodiment of the present disclosure determines a positioning authorization condition with a positioning user equipment through negotiation, and sends location information to the positioning user equipment under the positioning authorization condition such that the positioning user equipment positions the user equipment 600 such that privacy of the user equipment 600 can be effectively protected when the positioning user equipment positions another person, and user experience can be effectively improved.

It should be understood that, in this embodiment of the present disclosure, the processor 610 may be a CPU, or the processor 610 may be another general processor, a DSP, an ASIC, an FPGA or another programmable logic device, a discrete gate, a transistor logic device or a discrete hardware component, or the like. The general processor may be a microprocessor, or the processor may be any conventional processor.

The memory 620 may include a ROM and a RAM, and provide an instruction and data to the processor 610. A part of the memory 620 may further include a non-volatile RAM. For example, the memory 620 may further store information about a device type.

The bus system 630 includes not only a data bus, but also a power supply bus, a control bus, a state signal bus, and the like. However, for clear description, various types of buses in the figure are marked as the bus system 630.

In an implementation process, the steps of the foregoing methods can be completed using an integrated logical circuit of hardware or an instruction in a software form in the processor 610. Steps of the methods disclosed with reference to the embodiments of the present disclosure may be directly performed and completed by means of a hardware processor, or may be performed and completed using a combination of hardware and software modules in the processor. The software module may be located in a mature storage medium in the art, such as a RAM, a flash memory, a ROM, a programmable ROM, an electrically-erasable programmable memory, or a register. The storage medium is located in the memory 620, and the processor 610 reads information in the memory 620 and completes the steps in the foregoing methods in combination with hardware of the processor, and to avoid repetition, details are not described herein again.

Optionally, as an embodiment, the transmitter 650 is further configured to send a positioning request message to the first user equipment, where the positioning request message includes positioning request information, and the positioning request information includes positioning time request information or positioning location request information for the second user equipment to request the first user equipment to position the second user equipment. The receiver 640 is further configured to receive a positioning request response message sent by the first user equipment, where the positioning request response message indicates positioning time response information or positioning location response information that is determined by the first user equipment according to the positioning request message, and the processor 610 is further configured to determine, according to the positioning request response message received by the receiver 640, the positioning authorization condition for the first user equipment to position the second user equipment, where the positioning authorization condition includes the positioning time information that is jointly determined using the positioning time request information and the positioning time response information, or the positioning location information that is jointly determined using the positioning location request information and the positioning location response information.

It should be understood that, that the positioning request message includes the positioning request information is an implementation manner, and, in implementation, the positioning request message may directly include the positioning time request information or the positioning location request information for the second user equipment to request the first user equipment to position the second user equipment. Therefore, a structure of the positioning request information may not exist, and in this embodiment, the positioning request information may also be understood as the positioning request message.

Optionally, as an embodiment, the receiver 640 is further configured to receive a positioning request message sent by the first user equipment, where the positioning request message includes positioning request information, and the positioning request information includes positioning time request information or positioning location request information for the first user equipment to request to position the second user equipment, and the processor 610 is further configured to determine, according to the positioning request message received by the receiver 640, the positioning authorization condition for the first user equipment to position the user equipment, where the positioning authorization condition includes the positioning time information or the positioning location information that is jointly determined by the first user equipment and the second user equipment.

It should be understood that, that the positioning request message includes the positioning request information is an implementation manner, and, in implementation, the positioning request message may directly include the positioning time request information or the positioning location request information for the second user equipment to request the first user equipment to position the second user equipment. Therefore, a structure of the positioning request information may not exist, and in this embodiment, the positioning request information may also be understood as the positioning request message.

Optionally, as an embodiment, the processor 610 is further configured to determine that the positioning request information included in the positioning request message is the positioning authorization condition, or determine that modified positioning request information is the positioning authorization condition.

Optionally, as an embodiment, the processor 610 is further configured to determine that the positioning request information is the positioning authorization condition when determining that locally preset identifier information includes identifier information of the first user equipment that is included in the positioning request message.

Optionally, as an embodiment, the processor 610 is further configured to present first request information to a user, where the first request information indicates positioning request information included in the positioning request message sent by the first user equipment. The receiver 640 is further configured to receive a user instruction, where the user instruction indicates the positioning authorization condition that is determined by the user according to the positioning request information, and the processor 610 is further configured to determine the positioning request authorization information according to the user instruction received by the receiver 640.

Optionally, as an embodiment, the processor 610 is further configured to present second request information to a user, where the second request information indicates the positioning authorization condition. The receiver 640 is further configured to receive a user instruction, where the user instruction indicates a positioning authorization condition authorized by the user, and the transmitter 650 is further configured to send a positioning request response message to the first user equipment, where the positioning request response message includes the positioning authorization condition authorized by the user and received by the receiver 640.

Optionally, as an embodiment, the transmitter 650 is further configured to send a positioning request response message to the first user equipment, where the positioning request response message includes the positioning authorization condition determined by the processor 610.

Optionally, as an embodiment, the transmitter 650 is further configured to send the geographical location information to the first user equipment such that the first user equipment positions the second user equipment.

Optionally, as an embodiment, the processor 610 is further configured to determine map identifier location information according to geographical location information of the second user equipment, and the transmitter 650 is further configured to send the map identifier location information to the first user equipment such that the first user equipment positions the second user equipment.

Optionally, as an embodiment, the receiver 640 is further configured to receive a location information request message sent by the first user equipment.

Optionally, as an embodiment, the transmitter 650 is further configured to send a request message including the geographical location information to a server, where the request message is used to request the server to send map identifier location information obtained after matching is performed between the geographical location information and map information of the server. The receiver 640 is further configured to receive a request response message sent by the server, where the request response message includes the map identifier location information, and the processor 610 is further configured to determine the map identifier location information according to the request response message received by the receiver 640.

Optionally, as an embodiment, the processor 610 is further configured to determine, according to local map information and the geographical location information, the map identifier location information obtained after matching is performed between the geographical location information and the local map information.

Optionally, as an embodiment, the receiver 640 is further configured to receive a location request message sent by a server, where the message includes identifier information of the second user equipment, and the transmitter 650 is further configured to send a location request response message to the server, where the location request response message includes the geographical location information of the second user equipment such that the server sends, to the first user equipment, map identifier location information obtained after matching is performed between the geographical location information and map information of the server such that the first user equipment positions the second user equipment.

It should be understood that, the user equipment 600 according to this embodiment of the present disclosure may correspond to the second user equipment in the positioning method in the embodiments of the present disclosure or may correspond to the second user equipment 400 according to the embodiment of the present disclosure, and the foregoing and other operations or functions of the modules in the user equipment 600 are intended for implementing corresponding procedures in the methods in FIG. 3 to FIG. 9, which are not described herein again for brevity.

Therefore, the user equipment 600 in this embodiment of the present disclosure determines a positioning authorization condition with a positioning user equipment through negotiation, and sends location information to the positioning user equipment under the positioning authorization condition such that the positioning user equipment positions the user equipment 600 such that privacy of the user equipment 600 can be effectively protected when the user equipment 600 is positioned by another person, and user experience can be effectively improved.

In addition, the terms "system" and "network" are usually interchangeably used in this specification. The term "and/or" in this specification describes only an association relationship for describing associated objects and represents that three relationships may exist. For example, A and/or B may represent the following three cases: only A exists, both A and B exist, and only B exists. In addition, the character "/" in this specification generally indicates an "or" relationship between the associated objects.

It should be understood that the term "and/or" in this specification describes only an association relationship for describing associated objects and represents that three relationships may exist. For example, A and/or B may represent the following three cases: only A exists, both A and B exist, and only B exists. In addition, the character "/" in this specification generally indicates an "or" relationship between the associated objects.

It should be understood that sequence numbers of the foregoing processes do not mean execution sequences in various embodiments of the present disclosure. The execution sequences of the processes should be determined according to functions and internal logic of the processes, and should not be construed as any limitation to the implementation processes of the embodiments of the present disclosure.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely exemplary. For example, the unit division is merely logical function division and may be other division in actual implementation. For example, multiple units or components may be combined or integrated into another system, or some features may be ignored or not performed. In addition, the displayed or discussed mutual couplings or direct couplings or communication connections may be implemented using some interfaces. The indirect couplings or communication connections between the apparatus or units may be implemented in electronic, mechanical, or other forms.

The units described as separate parts may or may not be physically separate, and parts displayed as units may or may not be physical units, may be located in one position, or may be distributed on multiple network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present disclosure essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of the present disclosure. The foregoing storage medium includes any medium that can store program code, such as a universal serial bus (USB) flash drive, a removable hard disk, a ROM, a RAM, a magnetic disk, or an optical disc.

The foregoing descriptions are merely specific implementation manners of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A positioning method, comprising:
    obtaining, by a first user equipment, a positioning authorization condition for setting a location of a second user equipment on an electronic map, wherein the positioning authorization condition indicates a positioning location at which positioning of the second user equipment by the first user equipment is permitted, and wherein the first user equipment is permitted to position the second user equipment only when the positioning authorization condition is met;
    determining, by the first user equipment, that the second user equipment is located at the positioning location indicated in the positioning authorization condition;
    determining, by the first user equipment, the location of the second user equipment according to the positioning authorization condition only when the second user equipment is located at the positioning location indicated in the positioning authorization condition; and
    setting, by the first user equipment, the location of the second user equipment on the electronic map in response to determining the location of the second user equipment.

2. The positioning method of claim 1, wherein determining, by the first user equipment, the location of the second user equipment comprises:
    sending, by the first user equipment to a server, a request message comprising geographical location information, wherein the request message requests the server to send map identifier location information obtained after matching the geographical location information and map information of the server; and
    receiving, by the first user equipment from the server, a request response message comprising the map identifier location information after matching the geographical location information and the map information of the server.

3. The positioning method of claim 2, further comprising performing, by the first user equipment, matching on the geographical location information according to local map information.

4. The positioning method of claim 1, wherein the positioning location comprises positioning start point location information for positioning the second user equipment.

5. The positioning method of claim 1, wherein the positioning location comprises positioning termination point location information for positioning the second user equipment.

6. The positioning method of claim 1, wherein the positioning location comprises a positioning region range for positioning the second user equipment.

7. The positioning method of claim 1, further comprising negotiating, by the first user equipment, with the second user equipment to determine the positioning authorization condition.

8. A first user equipment, comprising:
    a memory configured to store instructions; and
    a computer processor coupled to the memory and configured to execute the instructions, which cause the processor to be configured to:
        obtain a positioning authorization condition for setting a location of a second user equipment on an electronic map, wherein the positioning authorization condition indicates a positioning location at which positioning of the second user equipment by the first user equipment is permitted, and wherein the first user equipment is permitted to position the second user equipment only when the positioning authorization condition is met;
        determine that the second user equipment is located at the positioning location indicated in the positioning authorization condition;
        determine the location of the second user equipment according to the positioning authorization condition only when the second user equipment is located at the positioning location indicated in the positioning authorization condition; and
        set the location of the second user equipment on the electronic map.

9. The first user equipment of claim 8, wherein the instructions further cause the computer processor to be configured to:
    send, to a server, a first request message comprising geographical location information, wherein the first request message requests the server to send map identifier location information; and
    receive, from the server, a first request response message comprising the map identifier location information after matching the geographical location information and map information of the server.

10. The first user equipment of claim 9, wherein the instructions further cause the computer processor to be configured to:
    send, to the server, a second request message comprising an identifier information of the second user equipment, wherein the second request message requests location information of the second user equipment;
    receive, from the server, a second request response message comprising map identifier location information obtained after matching geographical location information of the second user equipment and the map information of the server; and
    determine the map identifier location information of the second user equipment according to the second request response message.

11. The first user equipment of claim 8, wherein the positioning location comprises positioning start point location information for positioning the second user equipment.

12. The first user equipment of claim 8, wherein the positioning location comprises positioning termination point location information for positioning the second user equipment.

13. The first user equipment of claim 8, wherein the positioning location comprises a positioning region range for positioning the second user equipment.

14. The first user equipment of claim 8, wherein the instructions further cause the computer processor to be configured to negotiate with the second user equipment to determine the positioning authorization condition.

15. A positioning method, comprising:
obtaining, by a first user equipment, a positioning authorization condition by negotiating with a second user equipment to jointly determine the positioning authorization condition with the second user equipment, wherein the positioning authorization condition is for setting a location of the second user equipment on an electronic map, wherein the positioning authorization condition indicates a positioning location at which positioning of the second user equipment by the first user equipment is permitted, and wherein the first user equipment is permitted to position the second user equipment only when the positioning authorization condition is met;

determining, by the first user equipment, that the second user equipment is located at the positioning location indicated in the positioning authorization condition;

determining, by the first user equipment, the location of the second user equipment according to the positioning authorization condition only when the second user equipment is located at the positioning location indicated in the positioning authorization condition; and setting, by the first user equipment, the location of the second user equipment on the electronic map.

16. The positioning method of claim 15, wherein the positioning location comprises positioning start point location information for positioning the second user equipment.

17. The positioning method of claim 15, wherein the positioning location comprises positioning termination point location information for positioning the second user equipment.

18. The positioning method of claim 15, wherein the positioning location comprises a positioning region range for positioning the second user equipment.

19. The positioning method of claim 15, wherein the positioning authorization condition further indicates a positioning time at which positioning of the second user equipment by the first user equipment is permitted.

20. The positioning method of claim 19, wherein the positioning time indicates a time period or a time point.

* * * * *